United States Patent
Hare et al.

(10) Patent No.: US 11,386,522 B2
(45) Date of Patent: Jul. 12, 2022

(54) CALIBRATION OF INDIVIDUAL AND ARRAYED CAMERAS USING IMAGES AND VIDEO

(71) Applicant: Reification Inc., Oakland, CA (US)

(72) Inventors: Gabriel Archacki Hare, Daly City, CA (US); Keith Mertens, Oakland, CA (US); Daniel Rothman, New York, NY (US)

(*) Notice: Subject to any disclaimer, the term of this patent is extended or adjusted under 35 U.S.C. 154(b) by 0 days.

(21) Appl. No.: 16/988,574

(22) Filed: Aug. 7, 2020

(65) Prior Publication Data

US 2021/0118089 A1 Apr. 22, 2021

Related U.S. Application Data

(60) Provisional application No. 62/884,156, filed on Aug. 7, 2019.

(51) Int. Cl.
*G06T 3/00* (2006.01)
*G06T 5/00* (2006.01)
*G06T 7/80* (2017.01)

(52) U.S. Cl.
CPC ............ *G06T 3/005* (2013.01); *G06T 3/0043* (2013.01); *G06T 5/006* (2013.01); *G06T 7/80* (2017.01)

(58) Field of Classification Search
None
See application file for complete search history.

(56) References Cited

U.S. PATENT DOCUMENTS

| | | | |
|---|---|---|---|
| 2015/0007182 A1* | 1/2015 | Rossbach | G06F 9/4843 718/102 |
| 2016/0262685 A1* | 9/2016 | Wagner | A61B 5/1123 |
| 2017/0061624 A1* | 3/2017 | Seshadrinathan | H04N 5/247 |
| 2017/0339392 A1* | 11/2017 | Forutanpour | H04N 19/597 |
| 2018/0262687 A1* | 9/2018 | Hildreth | H04N 13/344 |
| 2019/0311496 A1* | 10/2019 | Bloom | G06T 7/33 |
| 2020/0184684 A1* | 6/2020 | Ma | G06T 7/174 |

* cited by examiner

*Primary Examiner* — Aaron M Richer
(74) *Attorney, Agent, or Firm* — Goodwin Procter LLP

(57) ABSTRACT

Disclosed herein are systems and methods for correcting distortion in a camera lens. The methods can include receiving at least one image of a calibration object, in which the image is captured via the camera lens and the lens has lens distortion. The methods can further include fitting a plurality of geodesics in the image; determining at least one connection equation for the plurality of geodesics; and determining a metric based on the connection equation, the metric comprising a first distorted radial coordinate. The methods can further include determining an undistorted radial coordinate based on the first distorted radial coordinate; determining a second distorted radial coordinate as a function of the undistorted radial coordinate; inverting the undistorted radial coordinate; and generating an undistorted image based on the inverted undistorted radial coordinate.

20 Claims, 11 Drawing Sheets

CALIBRATION OF INDIVIDUAL AND ARRAYED CAMERAS USING IMAGES AND VIDEO

CROSS REFERENCE TO RELATED APPLICATIONS

This application claims priority and benefit under 35 U.S.C. § 119(e) of U.S. Provisional Application No. 62/884,156, titled "Calibration of Individual and Arrayed Cameras Using Images and Video" and filed on Aug. 7, 2020, and is related to U.S. patent application Ser. No. 16/267,175, titled "Methods for Simultaneous Location and Mapping (SLAM) and Related Apparatus and Systems" and filed on Feb. 4, 2019, now published as U.S. PGPUB No. 2019/0178654, each of which is hereby incorporated by reference herein in its entirety.

TECHNICAL FIELD

The following disclosure is directed to methods and systems for calibration of cameras and, more specifically, methods and systems for calibration of individual cameras and/or arrays of cameras using images and video.

BACKGROUND

Calibration of cameras has presented a hardship to users of cameras and camera images for nearly as long as cameras have existed. For example, distortion in camera images can be especially challenging in employing cameras and/or images for critical tasks, such as for medical or defense purposes.

SUMMARY

Disclosed herein are methods and systems for camera calibration. Calibration may include the calibration of an individual camera and/or camera arrays.

In one aspect, the disclosure features a method for correcting distortion in a camera lens. The method can include receiving at least one image of a calibration object, in which the image is captured via the camera lens and the lens has lens distortion. The method can further include fitting a plurality of geodesics in the image; determining at least one connection equation for the plurality of geodesics; and determining a metric based on the connection equation, the metric comprising a first distorted radial coordinate. The method can further include determining an undistorted radial coordinate based on the first distorted radial coordinate; determining a second distorted radial coordinate as a function of the undistorted radial coordinate; inverting the undistorted radial coordinate; and generating an undistorted image based on the inverted undistorted radial coordinate.

Various embodiments of the method can include one or more of the following features.

The method can include storing the undistorted radial coordinate based on the first distorted radial coordinate in a lookup table. Determining the second distorted radial coordinate as a function of the undistorted radial coordinate can include integrating the second distorted radial coordinate. The method can include, based on the undistorted image, determining a plurality of constants of integration of the lens distortion. Generating the undistorted image can be based on the plurality of constants of integration. The method can include identifying a plurality of feature points and a plurality of straight lines in the image, in which the plurality of geodesics are fit based on the plurality of feature points and the plurality of straight lines.

The method can include determining a significance of at least a subset of the feature points to determine whether any feature points are outliers. The lens has a field of view greater than 180 degrees. Fitting the plurality of geodesics can include applying a linear regression, applying outlier suppression, and/or applying quality of fit analysis. The at least one image can results from a projection on an imaging surface, in which the imaging surface is a planar surface or a spherical surface. The corrected lens distortion can be independent from camera intrinsic parameters and image extrinsic parameters.

The method can include determining roll transform in the image; and inverting the roll transform in the image to generate an undistorted image. Determining the roll transform in the image can include, for each pixel in the image, solving a linear latency function to determine the roll transform for the pixel. The linear latency function can be solved for a plurality of pixels in parallel such that inverting the roll transform in the image is in near real time with display of the image in an display screen.

In another aspect, the disclosure features a system for correcting camera lens distortion. The system can include at least one memory for storing computer-executable instructions; and at least one processor for executing the instructions stored on the memory. The execution of the instructions programs the at least one processor to perform operations including: receiving at least one image of a calibration object, wherein the image is captured via the camera lens and the lens has lens distortion; fitting a plurality of geodesics in the image; and determining at least one connection equation for the plurality of geodesics. The operations can include determining a metric based on the connection equation, in which the metric includes a first distorted radial coordinate; determining an undistorted radial coordinate based on the first distorted radial coordinate; and determining a second distorted radial coordinate as a function of the undistorted radial coordinate. The operations can include inverting the undistorted radial coordinate; and generating an undistorted image based on the inverted undistorted radial coordinate.

Various embodiments of the system can include one or more of the following features.

The operations can include storing the undistorted radial coordinate based on the first distorted radial coordinate in a lookup table. Determining the second distorted radial coordinate as a function of the undistorted radial coordinate can include integrating the second distorted radial coordinate. The operations can include, based on the undistorted image, determining a plurality of constants of integration of the lens distortion. Generating the undistorted image can be based on the plurality of constants of integration. The operations can include identifying a plurality of feature points and a plurality of straight lines in the image, in which the plurality of geodesics are fit based on the plurality of feature points and the plurality of straight lines.

The operations can include determining a significance of at least a subset of the feature points to determine whether any feature points are outliers. The lens has a field of view greater than 180 degrees. Fitting the plurality of geodesics can include applying a linear regression, applying outlier suppression, and/or applying quality of fit analysis. The at least one image can results from a projection on an imaging surface, in which the imaging surface is a planar surface or a spherical surface. The corrected lens distortion can be independent from camera intrinsic parameters and image extrinsic parameters.

The operations can include determining roll transform in the image; and inverting the roll transform in the image to generate an undistorted image. Determining the roll transform in the image can include, for each pixel in the image, solving a linear latency function to determine the roll transform for the pixel. The linear latency function can be solved for a plurality of pixels in parallel such that inverting the roll transform in the image is in near real time with display of the image in an display screen.

DETAILED DESCRIPTION

Camera

Figure 1:
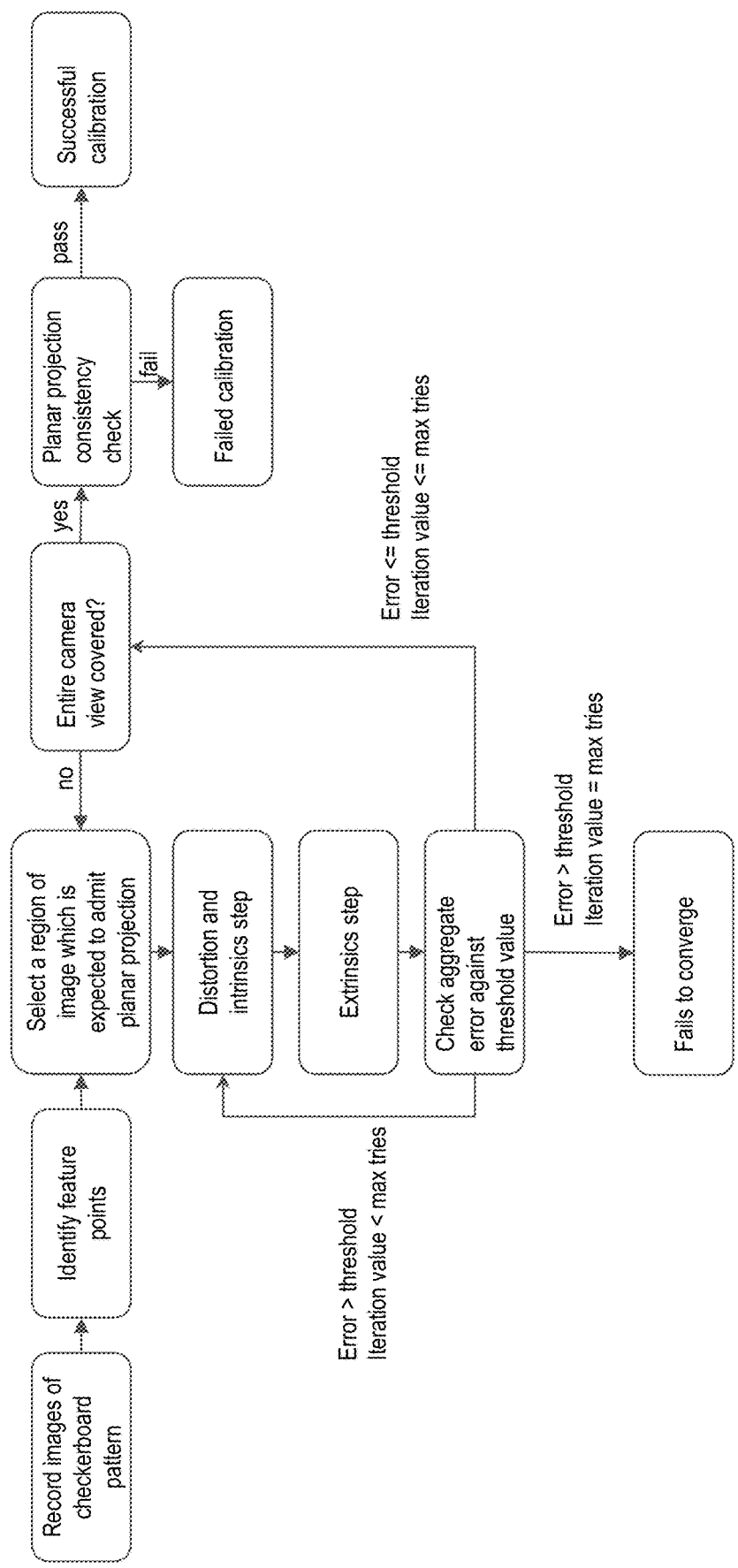
FIG. 1 is a flow chart illustrating the steps of the canonical method of calibrating a single camera.

In the discussion below the term "camera" refers to a physical mechanism for recording spatially arrayed independent measurements of its environment, which measurements are referred to in the following disclosure as "camera images." A "calibration" of a camera refers to a collection of maps which collectively transform the measurements made by a camera to an idealized form. These maps are specifically concerned with the spatial relationship of the descriptor array (e.g., color intensities of pixels). Although some embodiments yielding two dimensional images are described below, the inventors have recognized and appreciated that the geometric calibration methods disclosed below may be independent of the dimensions of the images to be calibrated. Many of the methods may be applied to a descriptor array of 1, 2, 3 or higher dimensions.

A pinhole camera is a canonical camera that creates a 2 dimensional array of measurements of luminance in directions from a single point from a static environment. Another example is a depth camera, which produces a 2 dimensional array of measurements of depth in directions from a single point in a static environment. In contrast, many sensing mechanisms provide spatial data that is not spatially arrayed. For example, an array of photo-reactive elements (e.g. photodiodes) would not on their own constitute a camera since their measurements have significant overlap so their measurements are not independent.

Single Camera Calibration

Camera calibration may be important stage of any system using data derived from camera images. In the discussion that follows, "calibration" of a single camera refers to a determination of a transformation from the recorded image to the image that would result instead from an ideal pinhole camera with a specified imaging surface. As such, the term "camera" will be understood to pertain to any system admitting such a calibration. In the interest of brevity, consideration will be restricted to a color camera yielding measurements of the luminance in red, green and blue wavelengths, in various directions corresponding to the pixels of a rectangular array. Nevertheless, the inventors have recognized and appreciated that many of these considerations may be generalized to pertain to a broader class of cameras.

Single camera calibration may include geometric transformation, in which, for each image color a mapping is defined between coordinates in the original image and the calibrated image. The calibration may also include an image-coordinate dependent adjustment of the image colors. In particular, wide angle lenses may yield a vignetting in which the image brightness is reduced as the distance from the center of the image increases. In the case that an image is intended to be consistent with respect to a targeted display a color mapping may be generated. For example, with respect to each of the red, green and blue display pixels it may be the case that the sensor response is a linear combination of red, green and blue sensor pixels. In some cases the sensors may have a response to frequencies (e.g. near infrared or near ultraviolet) that cannot be synthesized by the display, in which case an additional source may be used to characterize (and thereby suppress) the response of all pixel types to the undisplayed frequency.

In addition to the estimation of the geometric and color transformations applied to the image, an estimation of the feature scale can be performed. For any finite aperture, each point source of light will yield a projection of the aperture onto the imaging surface. In the case of an image the effective aperture is convolved with the image as a blurring kernel, thereby reducing the positional accuracy of projected point sources. Estimations of the effective blurring kernel (which may depend on color and on position within the image) may be considered a part of the calibration since this information informs uncertainty estimation associated with features extracted from the image.

Additional aspects of the camera's performance, such as gain and noise may be important for certain applications, but are assumed to be known attributes of the chosen configuration of the imaging system. As such, when considered in the methods described below they will be assumed to already be known. Any suitable techniques for determining a camera's gain or noise may be used.

Any surface with a predetermined geometry may be defined to be the calibrated effective imaging surface. For simplicity, a planar surface is typically chosen as the imaging surface for a calibration. However, in the case of a camera whose field of view approaches or exceeds π radians on any axis, a spherical imaging surface may be appropriate to encompass all measured directions in field of view. In general, it is not necessary that the imaging surface geometry used for the calibration match the physical imaging surface geometry of the camera.

Camera Array Calibration

Calibration of an array of cameras may include both the individual camera calibrations, and a determination of the relative positions of the effective pinholes, and the orientations of the effective imaging surfaces. For arbitrary sized arrays it is preferred that the calibration is a unified estimation of positions and orientations, as opposed to pairwise relationships. Any calibration necessarily has some error, and a system of pairwise relationships will yield conflicting estimates when comparing cameras that admit more than one pairwise path to establish a relative position and orientation.

In the case of an array of cameras there may be an ideal relative orientation of the cameras. For example, analysis of images from a pair of cameras might benefit from having parallel imaging directions, while analysis of images from a ring of cameras might benefit from having radial imaging directions. An image transform may be used to rotate an effective pinhole camera about the focal point (the pinhole). As such, the image transformations derived by a calibration may include rotations to cause the effective pinhole cameras to conform to ideal relative orientations.

Camera Motion Calibration

In the case where the camera is rigidly connected to a movable object whose position and orientation (or derivatives thereof) are independently measured as a function of time, the calibration may include an estimation of the displacement, rotation and latency of the camera relative to the tracked position and orientation of the object. This process may rely on measurements of the camera position and orientation that are independent from the object measurements. These measurements of the camera may be derived from a succession of images recorded by the camera in which features with a known spatial relationship are visible.

In particular, motion calibration may be performed in the case where the images from the camera are composited with rendered images of virtual objects. A stationary virtual object will appear to be stationary in relation to the real world when (e.g., only when) the relative position, orientation and latency of the cameras in relation to the tracked object are accurately estimated.

When the cameras are in motion, latency in the images from the cameras will generally result in misalignment of virtual and real objects. In some embodiments in which the delay in receiving images from the cameras is greater than the delay in receiving tracking information, in the absence of a latency calibration the real object view would be from a past position of the cameras, while the virtual object view would be from a more recent position. The latency calibration determines the difference in receiving delays between the tracking and the camera images. Given a latency calibration, alignment of virtual and real objects may be effected by synchronizing the tracking data with the images (e.g., by delaying whichever is received with less delay).

Real-Time Calibration

The inventors have recognized and appreciated that a calibration system could guide any position, rotation, lens or aperture adjustments that are performed when configuring a camera or array of cameras. In particular, camera alignment relative to eye position can be crucial for augmented reality. While the spacing between a user's eyes may be measured, it can also be determined simply by comparing the apparent size of objects viewed through the cameras with the object sizes viewed directly. Mechanically, the adjustment of the camera separation may also result in small rotations of the cameras, or even changes to the lens calibration, all of which would preferably be identified while the adjustment is performed.

The inventors have recognized and appreciated that many of the calibration methods considered below may be executed periodically while a camera system is in use, thereby verifying calibration consistency, and making any warranted adjustments to the cameras themselves, or to the calibrations that are applied. In some systems cameras are assembled as a stereoscopic pair and are expected to have parallel view centers, and coincident horizontal axes. In such cases, calibration errors in a camera array may be recognized and potentially corrected from measurements of the vertical disparity in corresponding features of simultaneously recorded images. This is particularly useful because mechanical stresses may deform an assembly such that an initial calibration is no longer optimal. By identifying and correcting calibrations while a system is in use the stability of the system may be significantly improved.

Prior Methods and Limitations

Prior methods of calibration have focused on single camera systems exhibiting minimal distortion. In general, distortion minimizing lens assemblies add weight and expense to a system. In comparison to a rectified image distortion minimizing lenses yield a uniform and maximal resolution, whereas the sampling interpolation required to rectify an image necessarily reduces the effective resolution. These priorities have been motivated by the expected use case of the camera images: display on a single flat screen. When multiple cameras are present in a system they are typically used as alternatives (e.g. wide and narrow fields of view) as opposed to a system for simultaneous capture. However, prior calibration methods are unreliable when applied to distorted images, arrays of more than 2 cameras, or assemblies comprised of multiple devices for measuring motion.

In the context of Augmented Reality (AR) and for Environmental Mapping (EM) and Autonomous Navigation (AN) the priorities for cameras has changed. A primary use of the images will be for geometric reconstruction. In this case, variable resolution is acceptable so long as the resulting uncertainty is sufficiently well described to be used in computations. In the case of autonomous navigation, maximal field of view is a priority, so an ideal assembly would be comprised of multiple cameras, and those cameras would use lenses yielding field of view exceeding $\pi$ radians. In the case of augmented reality virtual and real images may be composited, in which case at two cameras may provide images for a stereoscopic display, which ideally has a field of view commensurate to that of the human user, which exceeds itradians on the horizontal axis and approaches $\pi$radians on the vertical axis. In AR applications, because the cameras must be worn by a user, weight minimization is a priority, and high resolution is primarily needed near the center of a user's view, so lighter lenses yielding may be preferable those that reduce distortion. For both of these applications it is clear that a reliable technique for calibrating an array of wide angle cameras is crucial for the functioning of the system.

Calibration through external measurement may be used, and generally is during manufacturing. Nevertheless, the capability to calibrate the system using only its own measurements may be more efficient to use, and when applied to devices in use enables systems to remain correctly calibrated thereby ensuring their correct functioning.

Both AR and AN systems may incorporate other devices to measure motion. In the case of AN, the system enabling motion necessarily also provides an estimate of the actual motion. In the case of AR, the delay due to the time required to derive motion from images may be reduced by estimating motion from other devices, such as an Inertial Measurement Unit (IMU). In both cases, the correct functioning of the unit requires an accurate calibration of the relative rigid movements all components, including cameras, that provide estimates of motion. This novel calibration requirement is motivated by the real-time uses cases of systems for AR and AN presently being developed.

Validation of Calibration Using Augmented Reality

In some embodiments, a single camera or pair of cameras are attached to a Head Mounted Display to provide a composite view of real and virtual objects. In some embodiments a single camera and display are used, effectively creating a window (albeit without depth) through which the user may view a composition of virtual and real objects. In other embodiments a pair of cameras may be mounted on a display, which may present to each eye a view of virtual objects composited with the camera image corresponding to that eye. In either case any errors in the calibration can be diagnosed using the head mounted display and cameras by observing the apparent geometry and scale of real objects, and by observing the relationship between the real and virtual objects from various view static locations, and while the cameras are moving.

The inventors have recognized and appreciated that an error in motion calibration may be recognized when stationary virtual objects move relative to real objects as the cameras move. The inventors have recognized and appreciated that a SLaM system applied to the composited images may be used to assess the visual disparity in the motion of real and virtual objects.

The inventors have recognized and appreciated that calibration errors in the camera intrinsics, such as the field of view, may be recognized by inconsistent angles of real and corresponding virtual objects. For example, consider a planar wedge whose apex coincides with the focal point of a camera and whose center line coincides with the direction of the camera. When this wedge is displaced perpendicular to its surface it will appear in the image as parallel straight lines with an invariant separation determined by the angle of the wedge. In the absence of calibration error, this separation may match the separation of the edges of a similarly located virtual wedge with the same angle.

The inventors have recognized and appreciated that calibration errors in the lens distortion may be recognized by the curvature of known straight lines. This recognition can be automated by identifying and fitting curves in images that are expected to show straight lines.

Mathematical Notation Conventions

Much of the discussion that follows relies on concepts from Tensor Algebra and Differential Geometry. In particular, when measuring the image distortion a metric tensor (a symmetric linear map from two vectors to a scalar) is derived, so a notation convention will be followed in which the metric tensor is never implicit. Additionally, vectorial representations of the independent components of tensors with known symmetries are used. Finally, in many equations tensorial objects relating a variety of spaces of various dimensions and topologies are defined.

The tensor notation used here is an elaboration of the abstract index notation defined by Penrose. The "indices" of a tensor are placed to the right of the symbol identifying the tensor (a multi-linear function), and are either subscripts or superscripts, with subscripts indicating that a vector argument is expected and superscripts indicating that a covector argument is expected. Lowercase Roman indices indicate coordinate independence of an expression, while lowercase Greek indices indicate coordinate dependence. In particular, Roman indices follow the Einstein summation convention, so distinct Roman indices indicate a tensor product while a repeated Roman index appearing once as a subscript and once as a superscript indicates a contraction. In contrast, lowercase Greek indices denote a single index value, and so are explicitly summed. Finally, product symbols are elided in tensor expressions since indices are used to define multiplicative constructions. For example, the abstract and explicit expressions of the contraction of a vector with a covector are as follows:

$$c_\alpha v^\beta = \sum_\alpha^{R^2} c_\alpha v^\beta = c_1 v^1 + c_2 v^2$$

The convention used here is that indexing of an N dimensional space is enumerated by the integers $\{1, \ldots N\}$.

Tensors that transform multiplicatively with respect to a change of basis are identified using Roman letters, while coordinate dependent objects, such as the connection, and the coordinates themselves, are indicated using Greek letters. In particular, the basis vector and covector fields associated with a coordinate system may be denoted respectively as $b_\alpha{}^a$ and $q_b{}^\beta$. For example, the covariant derivative of a vector field is expressed in coordinate dependent terms as follows:

$$b_\alpha{}^a q_b{}^\beta \nabla_a v^c = \partial_\alpha v^\beta + \Gamma_{\alpha c}{}^\beta v^c$$

Additionally, certain tensors have canonical letters: the identity tensor is $I_a{}^b$; the Riemann curvature tensor field is $R_{abc}{}^d$; the metric tensor field is $m_{a\,b}$; the covariant derivative is $\nabla_a$; the coordinate partial derivative of functions is $\partial_\alpha$; and the coordinate connection is $\Gamma_{\alpha\gamma}{}^\beta$ as shown above. The numeral 0 denotes the zero tensor of any order, with respect to any spaces and bases.

The sign convention for the connection and curvature is that a raised index is associated with a positive sign when on the opposite side of the equality from the covariant derivatives. Given a metric $m_{ab}$, the coordinate constructions used herein are:

$$\Gamma_{ab}{}^d m_{dc} = \tfrac{1}{2}(\partial_a m_{bc} + \partial_b m_{ac} - \partial_c m_{ab})$$

$$R_{abc}{}^d = \partial_a \Gamma_{bc}{}^d - \partial_b \Gamma_{ac}{}^d + \Gamma_{ae}{}^d \Gamma_{bc}{}^e - \Gamma_{b\,e}{}^d \Gamma_{ac}{}^e$$

In some expressions it may be relevant to indicate invariance when signed permutations are applied to a set of indices. If the exchange of two indices is invariant, those indices are enclosed within round brackets, as $s^{(ab)}$. If instead the exchange of two indices yields a minus sign, those indices are enclosed in square brackets, as $t^{[ab]}$. Brackets may enclose any number of consecutive indices of the same valence, even when those indices are from multiple tensors, so the exterior product of vectors is $u^{[a}v^{b]}$. In general, the free indices in any tensor expression may be restricted to an irreducible representation of the symmetric group, which for the symmetric and anti-symmetric representations can be indicated bracket enclosures. Indices between brackets can be excluded from the symmetry projection by surrounding them with angle brackets, so the covariant derivative of an exterior product can be expressed as follows:

$$\nabla_a u_{[b} v_{c]} = u_{[b} (\nabla_a u)_{c]} + v_{[c} (\nabla_a u)_{b]}.$$

In some cases an index may pertain to a specific invariant subspace of a tensor space, or more specifically to an invariant representation with respect to a group. In this case the index (or series of indices) will be preceded by an expression indicating the representation, with a colon separating the representation name from the indices. All indices between the colon and prior to the end of the tensor or a comma are understood to be of the indicated representation. In particular, given an N tensor, the subspace defined by antisymmetry under index exchange is indicated by [N], and the subspace defined symmetry under index exchange will be (N), while the entire tensor product space is simply denoted by $\langle N \rangle$. The contraction multiplicity necessary for consistency with the contraction of all associated tensor indices will be understood to be implicit. For example, suppose that on a 2 dimensional base space an indexing of (2) is chosen such that the second index value has a multiplicity of 2, then the abstract and explicit expressions of the contraction are as follows:

$$c_{(2):a} v^{(2):a} = c_{(2):1} v^{(2):1} + 2 c_{(2):2} v^{(2):2} + c_{(2):3} v^{(2):3}$$

In some cases different indices of a tensor expression pertain to different vector spaces. In this case the index (or series of indices) is followed by the name of the relevant base space, with a bar separating the space name from the indices. All indices between the bar and following the start of a tensor or a comma are understood to be in the indicated space. In particular, given a space S, indexing of affine vectors in the space are denoted by $v^{a|S+1}$, and linear fractional transformations of the affine space are denoted by $F_{a|S+1}{}^{b|S+1}$. Likewise, when one or more coordinate dependent indices (indicated by a Greek symbol) pertain to a specific coordinate system, that coordinate system may be indicated by following the indices with a bar and then the Greek letter used for the coordinate system. (There is no conflict in notation, since the coordinate system implies the space.) For example, a change of basis from $\zeta$ coordinates to $\xi$ coordinates is effected by the application of an identity tensor, with components evaluated with respect to the different bases:

$$v^{\alpha|\xi} = \sum_\beta I_{\beta|\zeta}{}^{\alpha|\xi} v^{\beta|\zeta}$$

In the case of a tensor field, the tensor may be written as a function of coordinates using round brackets and specifying the coordinate choice by name, rather than individual arguments, as $v(\xi)^a$. Likewise, in the case of an indexed array of tensors, the array index may be written as a function argument with round brackets. This is done to clarify that there is no associated space, nor any duality restrictions on how indexed arguments may appear in an expression.

In the case of operations yielding tensors, the operator is applied using square brackets. Tensor indices appearing within the square brackets may also appear outside of the square brackets to clarify identity. It some cases it is necessary to consider specific components with respect to a specific basis, in which case the indices are replaced with numbers. To avoid confusion with exponentiation, the convention is followed that exponentiation is be indicated with square brackets. For example, the inverse of an operator may be written as follows:

$$I_a{}^b = M_a{}^c Inv[M_b{}^c]_c{}^b$$

Components of a Calibration System

The inventors have recognized and appreciated that the use of a suitable choice of analysis methods enables a substantial increase in speed as well as a simplification of the process and equipment required to calibrate a system consisting of one or more rigidly connected cameras, with the possible addition of independently measured points on an object that is rigidly connected to the cameras.

A calibration system supporting the calibration methods described in this disclosure may include one or more cameras, and one or more calibration objects. The computations performed for the calibration may be performed on any suitable computing system. Likewise the computations performed to apply the calibrations may be performed on any suitable computing system supporting the calibrated devices. As discussed above, each camera may be considered to include an imaging surface, an aperture and an arrangement of lenses, all of which remain in a fixed spatial relationship to each other. (In some embodiments, such as an actual pinhole camera, the "arrangement" of lenses may simply be an absence of any lens.) Each calibration object may be considered to have features with geometric properties (e.g., invariant geometric properties) that are known independently of the calibration process, and that can be recognized even in images from an uncalibrated system. In some embodiments, a calibration object has a known pattern of feature points on a flat surface, such as the corners of centers of squares on a chess board. In some embodiments the calibration object may be a cylinder, yielding an image profile with two straight edges.

In the usual case of a single camera whose lens is known to yield fields of view whose angles are significantly less than $\pi$, the calibration system may include the camera and a flat illuminated calibration object (such as a printed image or a computer screen) that displays an easily identifiable pattern of straight lines. In this case the process of calibration of one camera may involve recording at least 3 distinct views of the surface of the calibration object.

Specific restrictions on the form of the calibration object depend on the assumptions that can be made regarding the lens. Preferably, the calibration object has identifiable straight lines and includes spatial measurements sufficient to constrain the estimation of a general homography.

In some embodiments, when calibrating an array of cameras, the calibration object is visible to multiple cameras simultaneously, such that the position and rotation (collectively, "location") of each camera relative to the calibration object can be derived from the image that the camera records. In some embodiments the array of cameras may be installed in an environment, such as a stage or one or more rooms of a building. In other embodiments the array of cameras may be mounted on a moveable object such as a drone or a head mounted display.

In particular, in the case where images from the cameras will be shown on a display, the display itself may be used for the static calibration. (For example, in the case of a head mounted display where the display is removable.) This technique has the advantage of also supporting the calibration of the camera and display colors as well as the vignetting associated with both the cameras and the display.

Finally, in some embodiments one or more cameras may be mounted on an object that includes one or more independently measured points. Measurements at a point may include absolute coordinates, and/or any other measurements that can be derived from absolute coordinates, for example, inertial measurements (linear acceleration and angular velocity). In this case the calibration system may enable the independent motion of the measured point and attached cameras, while a stationary calibration object with at least 3 identifiable points remains in view. In particular, no armature to move the cameras is required, since the motion of the cameras need not be determined in advance.

In some embodiments multiple independently calibrated systems may interact. In this case each system establishes an independent coordinate system, so interactions may be predicated on the reconciliation of the coordinate systems. This reconciliation may be derived by identifying the transformations that align representative common features in the shared regions where interactions will occur (refer to U.S. patent application Ser. No. 16/267,175 titled "Methods for Simultaneous Location and Mapping (SLAM) and Related Apparatus and Systems" (hereinafter "U.S. application Ser. No. 16/267,175"), which incorporated herein by reference in its entirety).

Review of Certain Methods

The inventors have recognized and appreciated that the process of calibration may be broken into four distinct estimations: lens distortion, camera intrinsics, relative extrinsics (e.g., locations) and coupled motion. In the case of conventional methods this separation is not achieved, the estimation of relative extrinsics is limited to relations between two cameras, and the calibration of coupled motion is not addressed at all (refer to Hartley et al., *Multiple View Geometry in Computer Vision*, Second Edition, Cambridge University Press 2004 (hereinafter "Hartley") and Bradski, *The OpenCV Library*, Dr. Dobb's Journal of Software Tools 2000 (hereinafter "Bradski"), each of which are incorporated herein by reference in its entirety). Additionally, cases where the field of view approaches or exceeds radians are also not addressed by conventional methods.

The canonical approach to the calibration [FIG. 1] of a camera with no distortion is to consider a collection of undistorted planar images of a calibration object which is itself a planar image (refer to Hartley). As such, the camera image is a homography of the calibration image (which can be expressed as an 8 parameter linear fractional transform). It is expected that for each image the associated homography can be expressed as spatial location of the camera relative to the calibration object (referred to as the 6 "extrinsic" parameters) which is specific to the image, and the focal point and image shear (referred to as the 5 "intrinsic" parameters) which is invariant for all images.

For cameras with lens distortion, the estimated homographies may have biases that depend on the positions of the points of correspondence within the image. The canonical approach to this problem is to choose a parameterization of the lens distortion. To calibrate a camera subject to lens distortion, a simultaneous optimization may be performed with respect to the distortion of the camera, the intrinsics of the camera, and the extrinsics of each image is performed.

The quality of the calibration resulting from this canonical approach depends strongly on the choice of parameterization of the distortion. In the event of an evidently flawed calibration, a comparison of the data and calibration does not indicate how to modify the parameterization of the distortion, since the errors are also dependent on the estimated intrinsics and extrinsics. In many cases of interest this parameterization dependency makes the canonical approach to camera calibration unusable.

Given a successful calibration of individual cameras, the next step is to determine the relative locations of the cameras. In the case of two cameras, in each pair of simultaneously recorded images in which the calibration object is sufficiently visible to both cameras the extrinsic transformation of each camera has been estimated relative to calibration object, yielding an estimated relative camera location from each pair of images. The estimates of the relative camera locations may admit a unique optimal estimate, depending on the distribution of results, and the choice of error measure. Possible choices for error include the minimum geodesic distance on the manifold of rotations, or the embedding distance within the space of general linear transformations in 3 dimensions.

In the case where more than two cameras are present it is possible to encounter a "loop closure" problem. In the simplest configuration, suppose that there are 3 cameras, A, B and C, with fields of view such that a calibration object is visible to at most two cameras at a time. In the first frame a calibration object is visible to cameras A and B, enabling an estimation of the location of camera B relative to camera A. In the second frame a calibration object is visible to cameras B and C, enabling an estimation of the location of camera C relative to B, and thereby also relative to A. In the third frame the calibration object is visible to cameras C and A, which provides a second estimation of the location of camera C relative to A. In this case standard calibration methods are unable to optimally reconcile the two estimations of the relative locations of the cameras.

Improved Method of Estimating Lens Distortion

Figure 2:
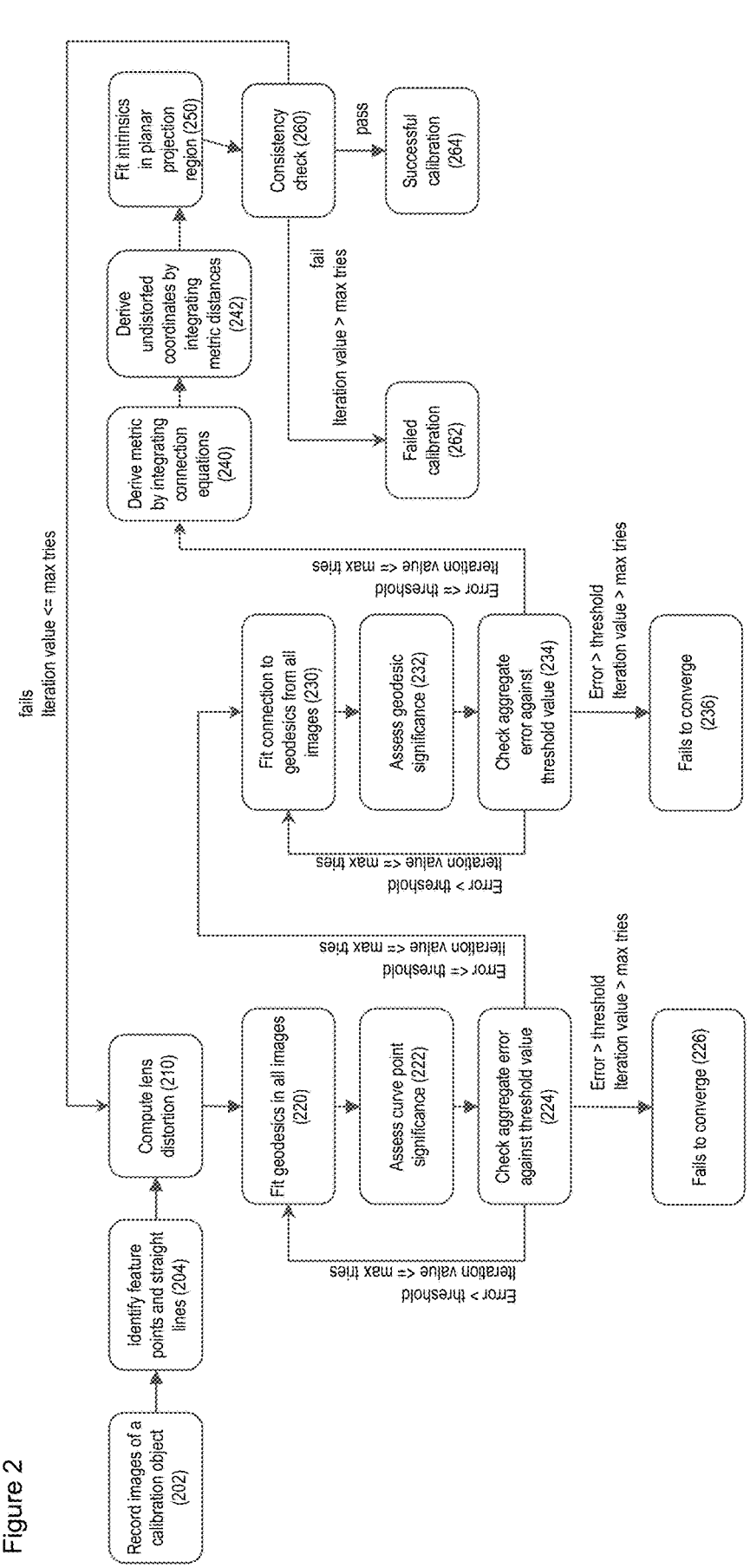
FIG. 2 is a flow chart illustrating the steps of a method of calibrating a single camera, according to some embodiments.

The inventors have recognized and appreciated that the relative distortion can be estimated independently from the camera intrinsics and image extrinsics [see FIG. 2]. This approach expedites and improves the accuracy of the entire process of camera calibration by reducing the problem of distortion estimation to an independent optimization, with data that can be examined after collection to guide the choice of functional fit. This approach naturally generalizes to the characterization of distortion of lenses whose field of view approaches or exceeds π radians.

Referring to FIG. 2, step 202 includes the recording of one or more images of a calibration object (as discussed above). In some embodiments, the system may receive the images of the calibration object. In step 204, the system may be configured to determine feature points and/or straight lines in the image(s).

Assuming that the physical components of a camera have been satisfactorily adjusted (e.g. focus, gain, and/or vignetting permit accurate imaging), the improved calibration process includes the estimation of the lens distortion in step 210. Step 210 can include steps 220-236. The recognition that the distortion may be calibrated separately is based on two key observations. The first key observation is that any continuous and monotonic distortion of an image can be constructed using a choice of coordinate functions on an undistorted image. The second key observation is that the undistorted image may be associated with either a planar or a spherical imaging surface, both of which are described by an invariant intrinsic curvature. Consequently, the problem of removing the distortion may be restated as the problem of solving for a metric tensor field $m_{a\ b}$, subject to the constraint that the metric describes the geometry of an imaging surface.

For the purpose of this discussion, a pinhole camera is one in which straight lines in 3 dimensions are projected to geodesics on the imaging surface. This limits the possible imaging surfaces to a plane or a sphere. For any curve $C(\lambda)$ parameterized by length λ contained in a flat surface S the second derivative is in the surface. For any isometric embedding of a manifold M the second derivative of a geodesic G(λ) parameterized by length λ is orthogonal to M. Consequently, in the case of a 2 dimensional manifold M embedded in a flat 3 dimensional space, given a focal point F and a point P on the embedded manifold M, if every flat surface S through F and P yields a geodesic G(λ), then the second derivative of G(λ) lies in the intersection of those surfaces: the line from F to P. This condition is satisfied for all points P by a sphere which has non-zero second derivatives, and by a plane which has zero second derivatives. Both manifolds are characterized by a constant scalar intrinsic curvature: $2/\rho^2$ for a sphere of radius ρ and 0 in the case of a plane.

Figure 7:
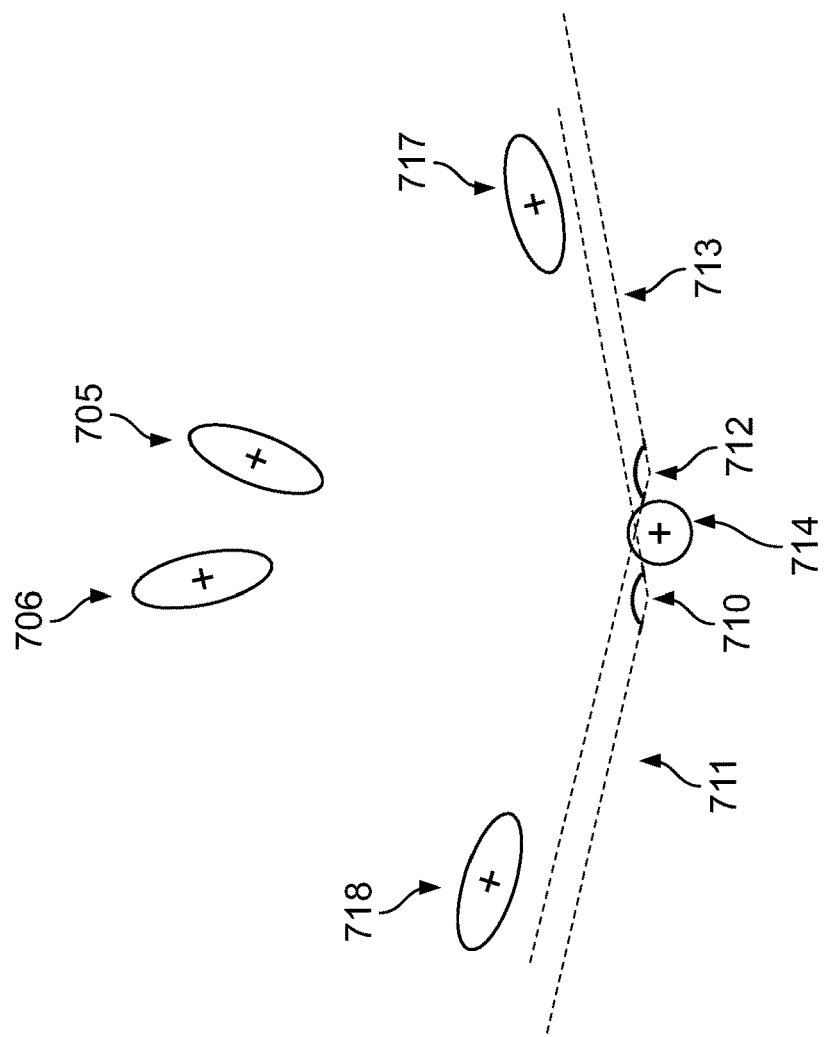
FIG. 7 is an exemplary diagram comparing camera position uncertainties resulting from narrow and wide field of view.
Figure 7:
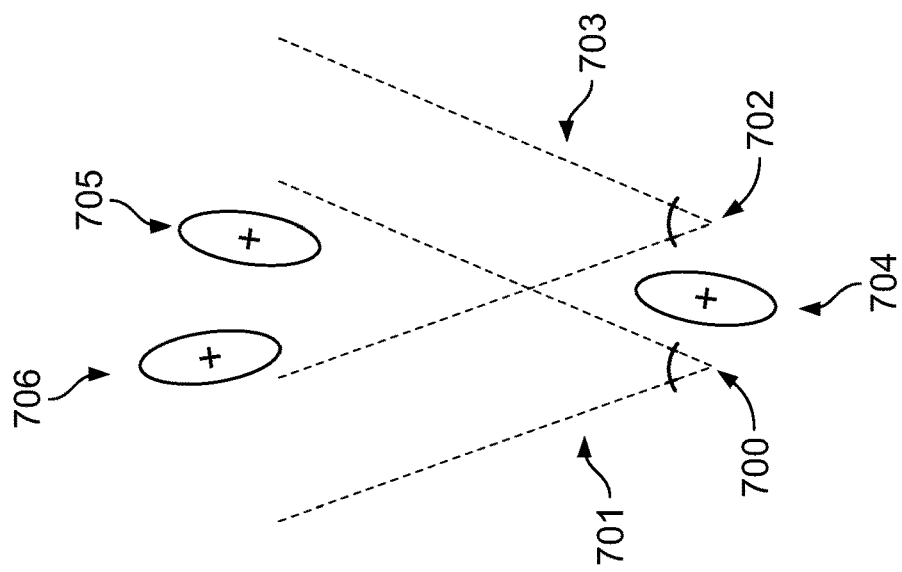

The inventors have recognized and appreciated that calibration to a spherical imaging surface may support a variety of applications. Given a spherical calibration, planar calibrations may be derived, thereby enabling the viewing of the full image using multiple planar displays. In the case where rendered objects are composited with real images, these planar calibrations enable compositing with a standard rendering pipeline yielding planar images. Furthermore, in the case of applications such as Simultaneous Location and Mapping (SLaM), the direction to image features relative to a camera may be sufficient, removing the requirement that the camera image can be mapped to surfaces. In the case where Simultaneous Location And Mapping uses an array of cameras, it is recognized that a narrow shared field of view [FIG. 7, 701 & 703] may result in significant depth uncertainty, which is ameliorated when shared view approaches radians on any axis.

Perspective projections modify both orthogonality and the relative distances between points, as measured from an image. Consequently, distance along geodesics can be determined after solving for the metric, so the generalized geodesic equation for arbitrary parameterizations can be used. Let the tangent field of the geodesic be denoted by $\tau^a$. For a given parameterization, the generalized geodesic equation admits change by an unknown factor in the direction of the tangent, but can be expressed without a scale factor in terms of the exterior product with the tangent field.

$$0 = \tau^{[a}\langle\tau^b\nabla_b\tau\rangle^{c]} = \tau^{[a}\langle\tau^b\partial_b\tau\rangle^{c]} + \tau^{[a}\langle\tau^b\Gamma_{bd}\rangle^{c]}\tau^d$$

The tangent and partial derivative of the tangent can be derived for any point on an identified geodesic in an image, so the generalized geodesic equation can be interpreted as a linear equation of constraint for the components of the connection $\Gamma_{\alpha\beta}^\gamma$. The free indices are restricted to [2], so in two dimensions each geodesic yields only one equation of constraint at points on its path. Furthermore, the scale invariance of the geodesic equation manifests as a single unconstrained dimension with respect to $\tau^{[a}\langle\tau^b\Gamma_{b\ d}\rangle^{c]}\tau^d$ for all possible $\tau^a$. This unknown dimension of the connection is resolved by the specification of the constant scalar curvature, which is related to the imaging surface radius (finite for a sphere, infinite for a plane).

The inventors have recognized and appreciated that, because this expression of the generalized geodesic equation is independent of the choice of parameterization, non-parameterized descriptions of the geodesic may be used [FIG. 2, step 220]. In some embodiments, a distorted geodesic may be locally described by a level set of a function. In these embodiments, the tangent field and the derivatives thereof can be derived from the function, with the actual parameterization of the geodesic being implicitly determined by an integral that need not be evaluated. The inventors have recognized and appreciated that a linear combination of functions of the coordinates may provide a description of geodesics that enables efficient fitting, using any suitable methods including, but not limited to, linear regression, outlier suppression and/or quality of fit analysis.

In step 222, the system may be configured to determine the significance of curve point, as described below. In step 224, the system may be configured compare an error in the geodesic fit against a threshold error value. If the error is greater than the threshold and the number of iterations is less than or equal to a threshold number of tries (e.g., a maximum number), control passes back to step 220. If error is greater than the threshold and the number of iterations is greater than a threshold number of tries (e.g., a maximum number), then at step 226 the fit fails to converse. If the error is less than or equal to the threshold error value and the number of iterations is less than or equal to a threshold number of tries, then control passes to step 230.

The inventors have recognized and appreciated that, given a collection of geodesics identified in one or more images, the lens distortion can be calibrated using any suitable technique to fit the metric field to optimize consistency with the measured geodesic equations, subject to the constant scalar curvature constraint. This fitting may proceed by first fitting a constrained subspace of the independent components of the connection field [FIG. 2, 230], using any suitable method (e.g. minimizing error with respect to a finite element representation, optimized via a relaxation algorithm). For instance, in step 232, the system may be configured to assess geodesic significance. In step 234, the system may be configured to compare an error (e.g., aggregate error) of the connection fit against a threshold error value. If the error is greater than the threshold and the number of iterations is less than or equal to a threshold number of tries (e.g., a maximum number), control passes back to step 230. If error is greater than the threshold and the number of iterations is greater than a threshold number of tries (e.g., a maximum number), then at step 236 the fit fails to converse. If the error is less than or equal to the threshold error value and the number of iterations is less than or equal to a threshold number of tries, then control passes to step 240. Given a fitted subspace of the connection field, the curvature constraint may be used to yield a set of differential equations for the metric that may be integrated [FIG. 2, 240] by any suitable technique (e.g. using finite element representation of the metric on boundary surfaces, integrated via Runge-Kutta). In summary, it has been shown that the lens distortion may be calibrated independently from the estimations of the camera intrinsics and extrinsics, thereby granting subsequent analysis the benefit of assuming an idealized pinhole camera geometry.

The inventors have recognized and appreciated that the use of recognizable known straight lines admits many more choices of calibration object than are afforded by the canonical methods. The inventors have recognized and appreciated that a pattern in which 5 or more geodesics intersect at a collection of points yields maximal constraints of the connection at those points, thereby simplifying the connection fitting process by enabling fitting to individual components, or linear combinations thereof. The inventors have also recognized that geodesics may be collected from multiple images, so images of a single straight edge (e.g. the edge of a white sheet of paper moved across a black background in various directions) would yield sufficient data for a lens distortion calibration. The inventors have recognized and appreciated that no assumption has been made regarding planarity of visible edges, so a cylinder could be used, since its profile yields two straight edges. The inventors have recognized and appreciated that since no a priori structure is assumed for the calibration object, environmental features (e.g. window frames) may be used opportunistically to enable calibration. The inventors have recognized and appreciated that the method of geodesic calibration enables a diversity of approaches to ad-hoc calibration that may be easily achieved by an untrained user. Finally, it should be noted that the canonical chess board can still be used with these methods.

Considering possible implementations of this method, the inventors have recognized and appreciated that measurement uncertainties and significance weights may arise in the reconstruction of geodesics in a distorted image [FIG. 2, 222 & 232]. A significance weight w can be used to treat a single measurement as w measurements in computations. The significance weight w can be such that $0<=w<=1$; however, in certain instances, $w<0$ and $1<w$ can be used. A curve point significance can be a significance weight associated with a single point used when fitting a geodesic curve. In the case that some points may be outliers, a curve point significance weight can be an estimated probability that the point is not an outlier. A geodesic can be given a weight based on the significance-weighted sum of its fitted points. If a geodesic may be an outlier, then its significance weight may be determined from computing an estimated local metric and assessing the significance with the estimated local metric. Images have finite resolution and noise, which may be used to derive estimated uncertainties. Similarly, the quality of a fitted geodesic description (e.g. the zero crossing of a polynomial) may be used to derive initial significances. Inclusion of these uncertainties and weights in the optimization process may provide significant improvements in the estimation of the distortion (e.g. when using a selection of environmental features, some of which might not be accurately straight). The inventors have further recognized that as a geodesic is an extended object, uncertainties in the fitted geodesic description can yield correlated variations at multiple points along geodesic, and therefore correlated uncertainties in the fitted connection field.

Figure 6:
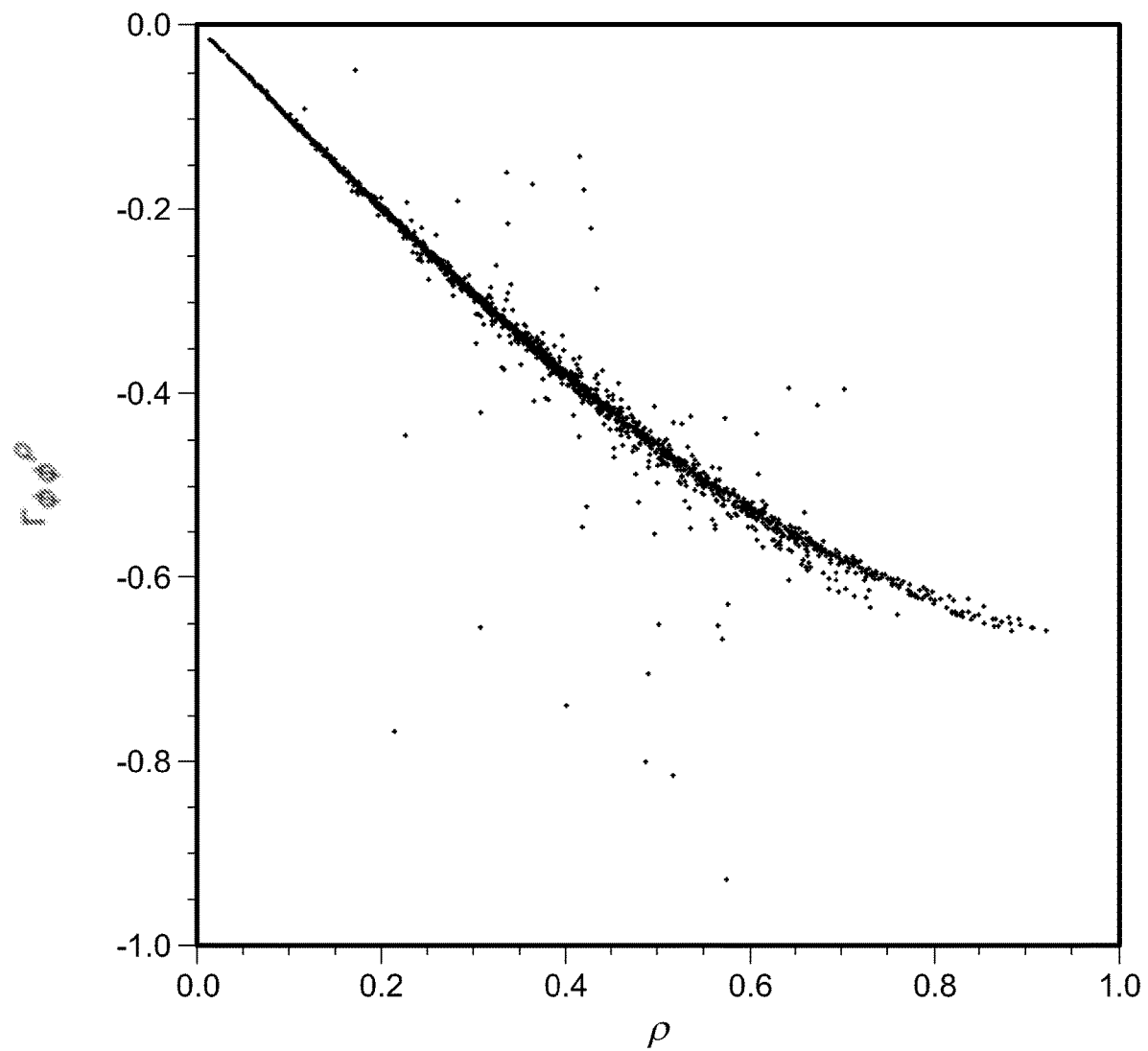
FIG. 6 is an exemplary plot of measurements of a component of the connection on an image subject to rotationally symmetric lens distortion, as a function of the distorted radius.

Considering possible implementations of this method, the inventors have recognized and appreciated that some measurements of the connection components may be outliers [see FIG. 6; FIG. 2, 222], which are identifiable as such only with respect to their disparity in relation to the majority of measurements. The inventors have recognized and appreciated that given an assumption of the distribution of the inliers (e.g. a normal distribution defined by a measurement's value and uncertainty) an iterative fitting process may be interleaved with a weighting of the data which will simultaneously suppress outliers.

Estimation of Lens Distortion Assuming Rotational Symmetry

In the case where the lens has a known symmetry, the problem of estimating the distortion may simplify. In particular, in some embodiments it may be reasonable to assume that a lens, and thus any distortion induced by the lens, is rotationally symmetric around the image center. In general, a symmetry reduces the degrees of freedom in the connection, and thereby expands the set of viable calibration objects. The cases of planar and spherical imaging surfaces with rotational symmetry are commonly applicable and enable specific embodiments of the calibration system they will be discussed in detail below.

In the case where the lens distortion is known (or may be assumed) to be rotationally symmetric around the image center circular coordinates may be chosen to describe the distorted image. Under this assumption, only the radial coordinate is distorted, so the metric remains diagonal, and the angular derivatives of the metric vanish. Consequently, only 3 independent components of the coordinate connection $\Gamma_a{}^c{}_b$ can be non-zero. With respect to the circular coordinates of the distorted image, let the tensor components associated with the radial coordinate basis be indicated by an index of 1, while the tensor components associated with the angular coordinate basis will be indicated by an index of 2.

$$\Gamma_{11}{}^1 m_{11} = \tfrac{1}{2}\partial_1 m_{11}$$

$$\Gamma_{12}{}^2 m_{22} = \tfrac{1}{2}\partial_1 m_{22}$$

$$\Gamma_{22}{}^1 m_{11} = -\tfrac{1}{2}\partial_1 m_{22}$$

With this simplification, each geodesic yields a single linear inhomogeneous equation of constraint, with one axis unconstrained by any geodesic.

$$(-\tau^1 \tau^1 \tau^2 \;\; 2\tau^1 \tau^1 \tau^2 \;\; -\tau^2 \tau^2 \tau^2) \cdot \begin{pmatrix} \Gamma_{11}{}^1 \\ \Gamma_{12}{}^2 \\ \Gamma_{22}{}^1 \end{pmatrix} =$$

$$\tau^2(\tau^1 \partial_1 \tau^1 + \tau^2 \partial_2 \tau^1) - \tau^1(\tau^1 \partial_1 \tau^2 + \tau^2 \partial_2 \tau^2)$$

$$(-\tau^1 \tau^1 \tau^2 \;\; 2\tau^1 \tau^1 \tau^2 \;\; -\tau^2 \tau^2 \tau^2) \cdot \begin{pmatrix} 2 \\ 1 \\ 0 \end{pmatrix} = 0$$

The unconstrained axis can be resolved by including the planar or spherical curvature constraint, which introduces a relationship between $\Gamma_{12}{}^2$ and $\Gamma_{22}{}^1$. In both cases, the square root of the angular component of the undistorted metric is a function of the integral of the square root of the radial component of the metric, so the components can be related by a differential equation that also pertains to the distorted coordinates. When the imaging surface is planar let the radial coordinate in units of the distance from the focal point to the imaging plane, then the metric components are related by the following differential equation.

$$\partial_1 \sqrt{m_{22}} = \sqrt{m_{11}}$$

When the imaging surface is a sphere, let the radial coordinate be azimuthal angle from a pole, then the metric components are related by the following differential equation.

$$\partial_1 \sqrt{m_{22}} = \sqrt{m_{11}(1-m_{22})}$$

Finally, since the scale of the imaging surface (the field of view) is not included in the distortion estimation, the origin may be chosen as a point where the connection values, or their divergence poles, are known a priori, thereby constraining the possible fits.

Given a collection of geodesics from one or more images, these equations provide constraints sufficient to fit the components of the connection [FIG. 2, 230]. Given an estimated connection field as a function of the distorted radius, the metric field can be derived by integrating the simplified equations relating the connection and metric [FIG. 2, 240]. Finally, given a metric field, the undistorted radial coordinate as a function of the distorted radial coordinate can be derived by integrating the square root of the radial component [FIG. 2, 242].

In step 250, the system may be configured to fit intrinsics in a planar projection region. In step 260, the system may check the consistency of the fit. If the consistency check fails and the iteration value is greater than a threshold number of tries (e.g., a maximum number), then the system determines that the calibration has failed. If the consistency check fails and the iteration value is less than or equal to the threshold number of tries, then control passes to step 210 (or step 220).

In the case of a planar imaging surface, any linear affine transformation can be applied without invalidating the geometry of the ideal camera. These degrees of freedom can be used to address shear resulting from a non-square sensor pixel structure, or even to identify the focal point, when it differs from the rotational symmetry pivot. However, in the case of a spherical imaging surface, any shear transformation would invalidate the ideal camera geometry, including a uniform scaling since a unit radius was assumed.

The inventors have recognized and appreciated that the assumption of rotational symmetry relies on the correct initial definition of the rotational pivot and image shear. In the case of a planar imaging surface, an initial estimate may be used to derive an estimated lens distortion, yielding a relatively undistorted image which may yield a refined estimate of the pivot and shear—establishing an iterative process of alternating between solving for the distortion (e.g., by returning to step 210) and solving for the camera intrinsics. The inventors have recognized and appreciated that, in the case of a spherical imaging surface, the same process may be applied by using the distortion to identify a region that can be mapped to a planar imaging surface. Because the pivot and shear pertain to the actual imaging surface rather than an ideal camera, the intrinsics derived for the region can be applied to the entire image, thereby potentially improving the quality of a subsequent distortion estimate.

The inventors have recognized and appreciated that, under the assumption of rotational symmetry and for a given imaging surface, the intersection of any two geodesics yields a maximal set of constraints of the curvature, thereby simplifying the fitting process to consideration of individual components. The inventors have recognized and appreciated that geodesics may be found in different images recorded by the camera, with an intersection determined by their composition. In particular, when using a calibration object whose edges do not intersect (e.g. a cylinder), the intersections of three or more edges at a point would be difficult to achieve, whereas intersections of two edges may be achieved with a simple change of orientation of the calibration object in successive images. Alternatively, if a chess board is used for calibration, a single image may be sufficient to estimate the lens distortion, although more images may improve the quality of the calibration.

Figure 8:
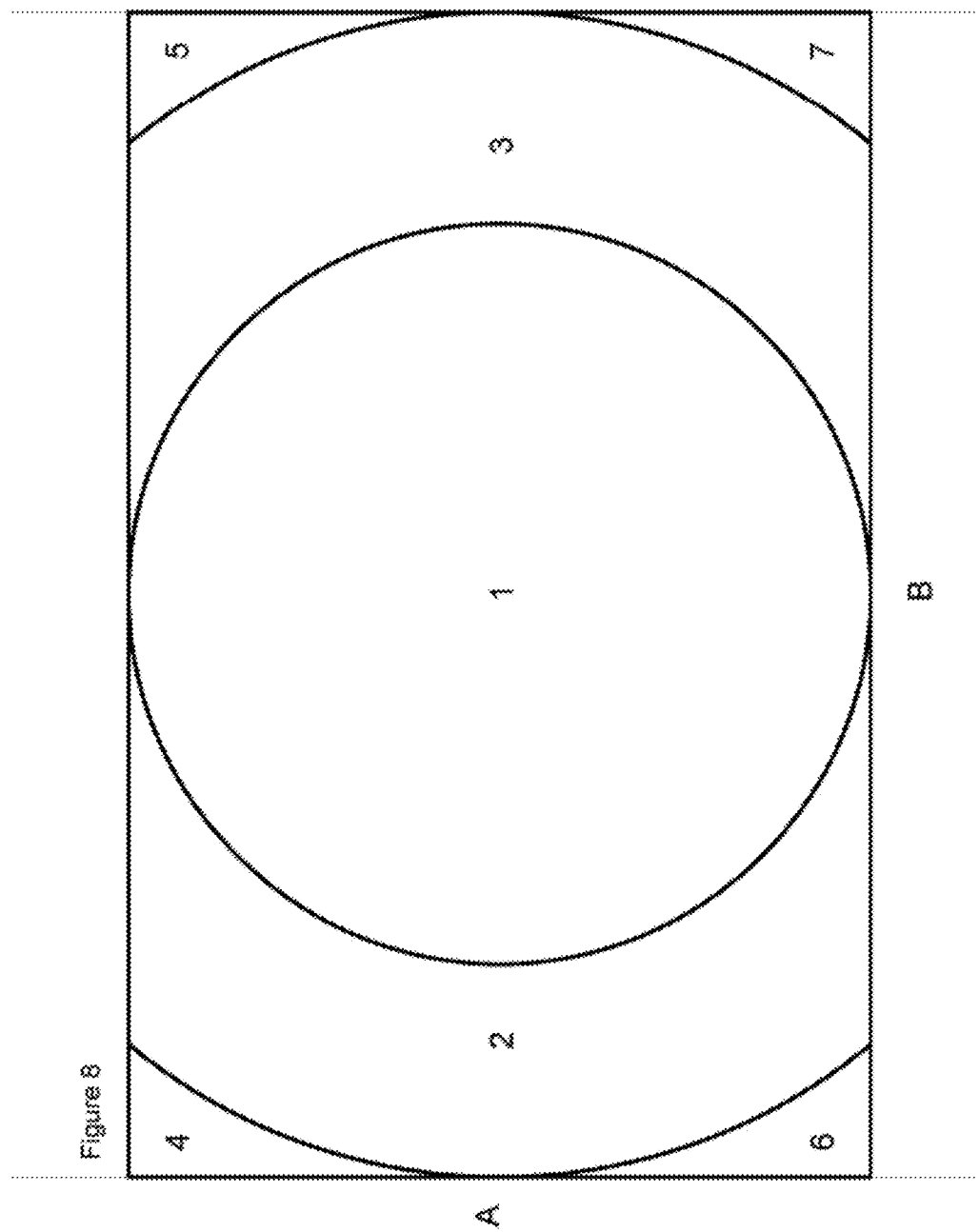
FIG. 8 is an exemplary diagram showing rotationally connected regions of a rectangular imaging sensor.

The inventors have recognized and appreciated that, for some shapes of imaging surface, different radial distortions may be derived in separate regions of the image while maintaining rotational symmetry within those regions and a specified order of continuity throughout the entire image. Considering only rotations about the center of the radial lens distortion, let a rotationally connected arc be all points in the image that can be continuously rotated into each other while remaining in the image. Let a rotationally connected region be a maximal region in which all paths that are monotonic in the radial coordinate and maximal in extent yield a set of rotationally connected arcs covering the entire region. In the case of a rectangular image with sides lengths $A \leq B$ with the pivot of rotational symmetry at the center there will be 7 rotationally connected regions [see FIG. 8]: a disk covering radial coordinates in the range $[0, A/2)$; two arcs from covering radial coordinates in the range $[A/2, B/2)$; four corners covering radial coordinates in the range $[B/2, \sqrt{A^2+B^2}/2]$. The inventors have recognized and appreciated that this partitioning enables calibration methods that assume rotational symmetry to address a more diverse class of lens distortions.

Estimation of Camera Homography

In the case of a camera yielding planar images without lens distortion (by design, or by lens distortion calibration), an efficient method of calibration is available in which the estimation of the camera intrinsics is independent of the estimation of the extrinsics of each image. Given a camera image of a calibration object having feature points with a known spatial relationship, a homography can be estimated when at least 4 non-collinear points are visible. Let the 3 dimensional space relative to the camera image be denoted by I and let the 2 dimensional space relative to the calibration object features be denoted by F, then the homography can be described by a linear fractional transform $H_{b|F+1}{}^{a|I+1}$.

Methods of locating feature points within an image may introduce some uncertainty, which may be known from aspects of the image including, but not limited to, feature geometry, color contrast and pixel resolution in the vicinity of the feature. Given these uncertainties, the objective function for a homography fit to image data may be defined as the minimization of error with respect to these uncertainties. Let $f(\sigma)^{a|F+1}$ denote a feature point, $i(\sigma)^{a|I+1}$ denote the corresponding image point, and $u(\sigma)^{a\ b}$ denote the uncertainty of the image point. The error minimizing objective function $X^2$ is then defined as follows:

$$X^2 = \sum_a Inv[u(\sigma)]_{ac} \left( i(\sigma)^{a|I} - \frac{H_{b|F+1}{}^{a|I} f(\sigma)^{b|F+1}}{H_{b|F+1}{}^{3} f(\sigma)^{b|F+1}} \right)\left( i(\sigma)^{c|I} - \frac{H_{d|F+1}{}^{c|I} f(\sigma)^{d|F+1}}{H_{d|F+1}{}^{3} f(\sigma)^{d|F+1}} \right)$$

This equation may be optimized using any suitable methods. One such method is to implement Newton's method using expressions for the first and second derivatives of the objective function, projected to avoid solving for the unconstrained scale. Another such method is to construct a locally equivalent quadratic objective function by multiplying the error terms and dividing the uncertainties by the homography denominators. This local approximation can be optimized with respect to the modified error terms via an eigen decomposition to optimize the homography, and is followed by an update of the modified uncertainty on iteration. These methods may be combined, using the modified linear solve to initialize to a concave region, and Newton's method to rapidly converge to an optimal estimate.

The inventors have recognized and appreciated that the use of an inverse uncertainty enables lines to be measured features used to constrain a homography. A line on an image can be described as a point with one axis of infinite uncertainty, or equivalently with one axis of zero inverse uncertainty. The inventors have recognized and appreciated that in the case of fewer than 4 points a partially constrained homography may still be derived by suitably restricting the subspace in which fitting is computed. In some embodiments these partially constrained homographies may be relevant to subsequent stages of the calibration.

The process of identifying features in an image and associating them with features of a calibration object admits the introduction of outlier data, through a biased reconstructor, an incorrect match or some other technique. The inventors have recognized and appreciated that the fitting process facilitates a determination of feature significance by assessing the distribution of feature pulls (refer to U.S. application Ser. No. 16/267,175). The inventors have further recognized that a determination of feature significance may suppress outlier feature influence and thereby improve the consistency of homography fitting. The inventors have recognized and appreciated that the quadratic approximation of the objective near the optimizing extrema provides a measure of homography uncertainty and significance that may inform subsequent stages of the calibration process.

Estimation of Camera Intrinsics

Let C denote the space in which the camera and calibration object are located. The homographies of a set of images may be assumed to be a composition of an Affine "intrinsic" transformation $A_{b|I+1}{}^{a|I}$ that is invariant in all images, and a Euclidean "extrinsic" $E_{b|C+1}{}^{a|C}$ transformation of the calibration relative the camera that is specific to each image. Without loss of generality the intrinsic transformation may be restricted to apply only a shear, (or any related presentation, such as upper triangular) since any rotation would be subsumed in the extrinsic transformation. In the case that the lens distortion has been independently calibrated the intrinsics represent the unknown constant metric, which establishes a coordinates on the image in units of the focal length, thereby establishing the view angle to any point on the image.

To elucidate the composition, choose a coordinate system $\zeta^\alpha$ relative to the camera so that the image plane is at $\zeta^3=1$, so that a fractional transform yielding points in I+1 is equivalent to a transform yielding points in C, and let the calibration object be planar with all features initially on the surface $\zeta=0$, so that the extrinsic transform reduces to $E_{b|F+1}{}^{a|C}$. Projection of the features to the imaging surface yields $E_{b|F+1}{}^{a|I+1}$, which then admits a composition with the intrinsic Affine transform.

$$H_{b|F+1}{}^{a|I+1} = A_{c|I+1}{}^{a|I+1} E_{b|F+1}{}^{c|I+1}$$

It is known that given 3 or more images the intrinsic transform can be estimated, without requiring any estimation of the extrinsic transforms (refer to Zhengyou Zhang, *A Flexible New Technique for Camera Calibration*, IEEE Transactions on Pattern Analysis and Machine Intelligence, 22(11):1330-1334, 2000 (hereinafter "Zhengyou"), which is incorporated herein by reference in its entirety). The columns of the extrinsic Euclidean transform columns $E_{1|F+1}{}^{c|C}$ and $E_{2|F+1}{}^{c|C}$ are columns of a rotation matrix, and are therefore normalized and mutually orthogonal. Using the mapping from affine feature F+1 and affine image I+1 spaces into C, each image yields a set of constraints for the quadratic contraction of the inverse affine transformation.

$$B_{be} = Inv[A]_b{}^c Inv[A]_e{}^f m_{cf}$$

$$B_{be} H_\alpha{}^b H_\delta{}^e = E_\alpha{}^c E_\delta{}^f m_{cf}$$

Since the contraction of Euclidean transforms is known when $\alpha \in \{1, 2\}$ and $\delta \in \{1, 2\}$, this reduces to a system of 3 linear constraints for $B_{b\,e}$. Because $H_{b|F+1}{}^{a|I+1}$ is known only up to scale, these constraints may be reduced to 2 homogeneous linear equations. The tensor $B_{b\,e}$ is symmetric so its 6 independent components may be represented as $B_{(2):a}$. Consequently at least 3 images may be used to yield a sufficient set of constraints for estimation up to scale. Finally, the system of quadratic equations can be solved to recover the intrinsic Affine transform.

The inventors have recognized and appreciated that an independent prior calibration of the lens distortion may enable the use of this alternative approach thereby improving both the accuracy and efficiency of the entire calibration process. The inventors have recognized and appreciated that lenses without distortion are often significantly more expensive, and that in many situations direct measurements of lenses (as opposed to the in-situ measurements considered here) may not be possible, or may not be affordable, making the in-situ calibration of lens distortion a requisite for many potential camera designs.

The inventors have recognized and appreciated that by using a calibration object comprised of features sufficient to fit homographies on 3 or more visible planar surfaces a single image may also be sufficient for this stage of the calibration. In general, a known calibration object can be decomposed into constituent planar constituents (e.g. a mesh triangular faces with vertices corresponding to identifiable feature points), with each constituent yielding at least a partially constrained homography. The inventors have recognized and appreciated that a calibration object may be designed to envelop a camera thereby covering its entire field of view. Complete coverage of the field of view with images of the calibration object is recognized to improve the accuracy of a calibration, so an enveloping calibration object may improve the speed and efficiency of the calibration process.

Estimation of Camera Extrinsics

Given a camera yielding undistorted images with known focal coordinates, an image of a calibration object may be used to estimate the extrinsic Euclidean transformation of the object relative to the camera. The restriction to Euclidean transformations is a non-linear restriction to allow only rotational changes in direction. This constrained objective function may be optimized using any suitable methods. One such method is to implement Newton's method, with the tangent space restricted to the manifold of rotations, and the step restricted to geodesic motion on that manifold. Another such method is to construct a locally equivalent quadratic objective function by multiplying the error terms and dividing the uncertainties by the homography denominators which can be solved for a general homography. Given a general linear transform of directions, it is known that the nearest rotation with respect to the Frobenius norm can be found using the Singular Value Decomposition, so the solution to the linear local approximation can be projected to a rotation. These methods may be combined, using the modified linear solve to initialize to a concave region, and Newton's method to rapidly converge to an optimal estimate.

The inventors have recognized and appreciated that the fitted homography uncertainty estimation can by suitable restriction be applied to the case of extrinsic Euclidean transform estimation. The inventors have further recognized and appreciated that using the estimated Euclidean transform and uncertainty the features of the object may be described as being positioned relative to the camera with correlated uncertainties. The inventors have recognized and appreciated that when multiple cameras are calibrated simultaneous views of a calibration object may be used to establish the relative locations of cameras.

The inventors have recognized and appreciated that an efficient homography estimation enables new applications of the method. One such application is to real time calibration or re-calibration of a camera system. Another such application is to guide the adjustment of the physical position of a camera so that the effective focal point achieves a desired relationship to the calibration object, or by association to another camera.

The inventors have recognized and appreciated that an efficient estimation of the extrinsic Euclidean transform of a camera can enable real-time estimation of the motion of a single camera relative to an object with known features that are identifiable in images.

Estimation of Camera Array Alignment

Figure 9:
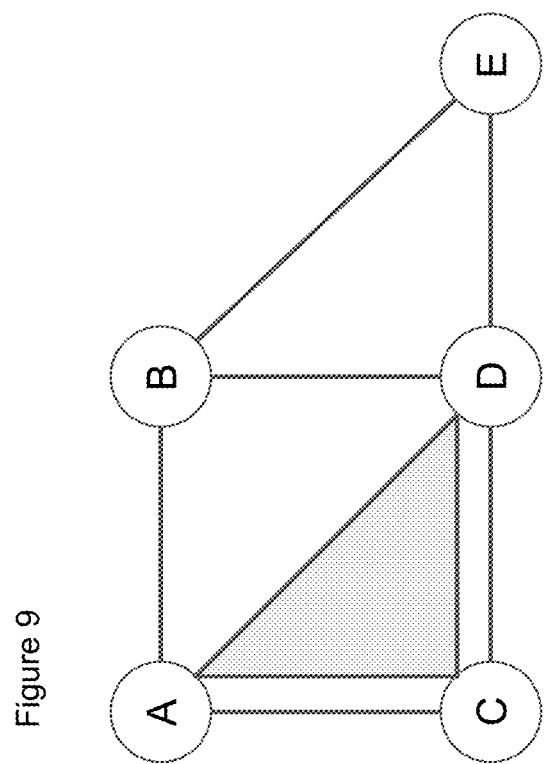
FIG. 9 is an example Relative Location Graph for five cameras.

In some embodiments, more than one camera may be calibrated. In step 302, the system may receive simultaneously recorded images using a calibration object, as described in detail herein. In step 304, the system may be configured to apply the above-discussed single camera calibration to images captured by two or more cameras. The individual camera calibrations described above allow the cameras to be effectively described as pinholes, with known fields of view. When two or more cameras have a view of a calibration object sufficient to estimate the location of the camera relative to the object, an estimate of the relative transformation of those cameras can be computed by any suitable method of obtaining an optimal estimate from the available measurements of the relative locations. It is helpful to consider a "relative location graph" in which nodes are cameras and the simultaneous viewing of a calibration object joins all cameras able to view the object in a simplex [see FIG. 9]. In this case, a "loop closure" occurs when there exists an embedding of a loop in the graph such that it cannot be retracted to a point by movements across simplexes. Calibration is possible when the relative location graph is connected. However, as discussed above, when there are more than 2 cameras accumulated errors along the distinct paths in a loop closure may yield conflicting estimates of relative location.

In step 306, the system may be configured to identify feature points and straight lines in the images. The inventors have recognized and appreciated that the loop closure problem may be resolved by considering the problem of creating a "constellation" of all the locations of features of the calibration object as it is moved relative to a stationary array of cameras. As described above, each camera's view of the calibration object yields an estimation of the locations of features relative to the camera, together with their correlated uncertainties [FIG. 3, 308]. All images recorded by a camera yield a constellation of features, which may be matched to constellations of features from other cameras in the system [FIG. 3, 310]. Given a collection of matches, an optimal relative transform may be found by any suitable technique. In some embodiments the feature correlations may be ignored. In some embodiments estimation of feature significance may be included in the fitting process using pulls derived from the feature uncertainties (refer to U.S. application Ser. No. 16/267,175). In some embodiments the uncertainties may be modified to increase the catchment volume of the fitting process (refer to U.S. application Ser. No. 16/267,175). In some embodiments the correlated uncertainties may be retained, in which case linear regression occurs in a space defined by the products of all correlated features.

Figure 3:
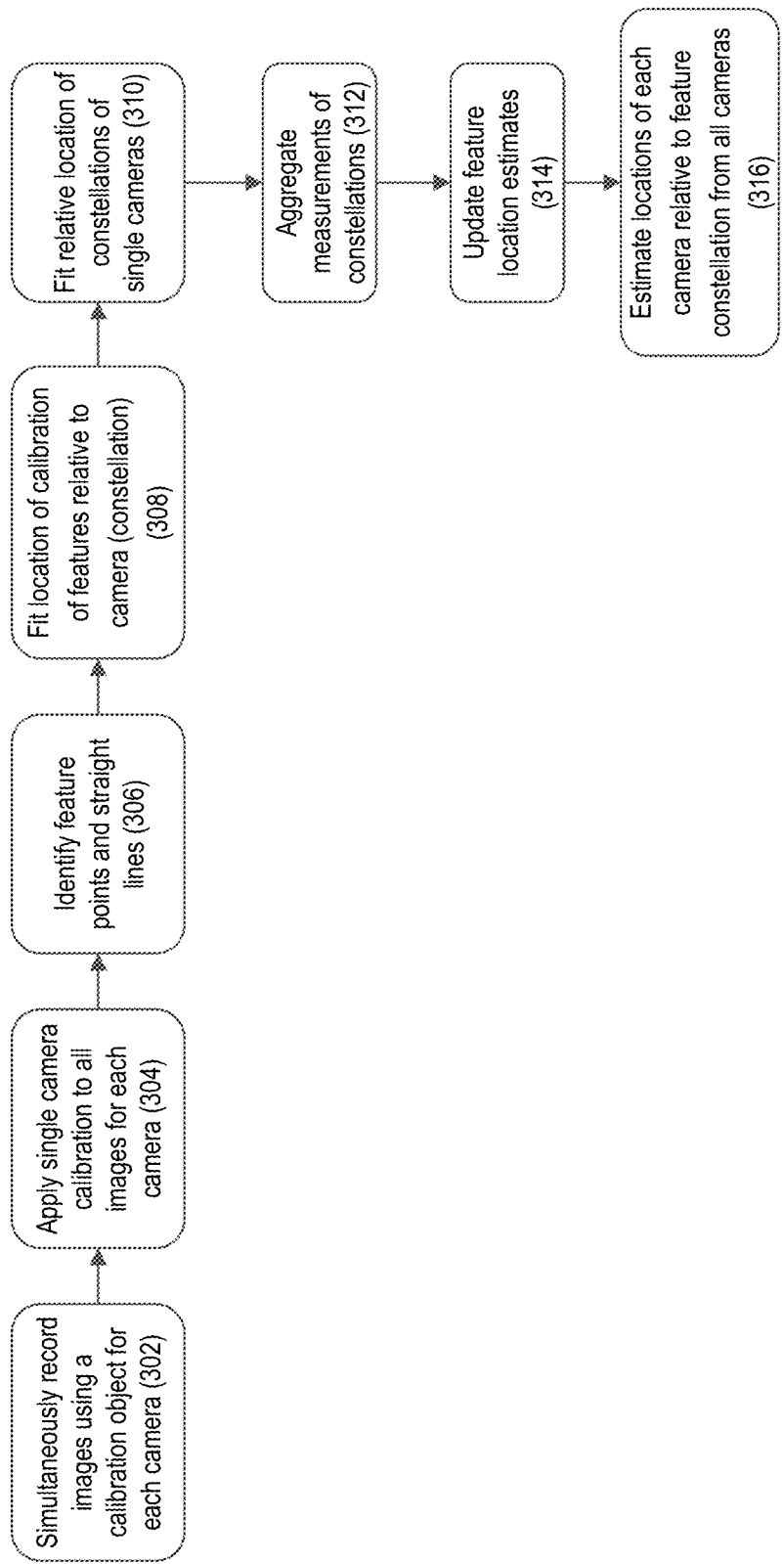
FIG. 3 is a flow chart illustrating the steps of a method of calibrating an array of cameras, according to some embodiments.

The inventors have recognized and appreciated that the construction of a constellation may involve the aggregation of measurements made by multiple cameras [FIG. 3, 312]. This aggregation may be implemented using the methods of Simultaneous Localization and Mapping (SLaM), treating each camera in the array as a new unknown location and solving for the alignment of the cameras constellation using identified common features. In some embodiments this aggregation may sum an inverse covariance and lowered mean with uniform motion projected out, thereby ensuring that loop closures yield constellations that are optimal with respect to all contributing measurements (refer to U.S. application Ser. No. 16/267,175). In some embodiments, aggregation of features from a camera will result in updated estimates of all aggregated features [FIG. 3, 314]. These updated features may be used to determine the alignment applied to the aggregation of constellations from additional cameras. When all constellations have been aggregated the relative camera locations can be estimated by aligning each camera's constellation to the aggregated constellation from all cameras [FIG. 3, 316].

With respect to depth estimation of features from two or more views, the lateral uncertainty grows linearly, while the depth uncertainty grows quadratically. Consequently, an estimation of the camera position (e.g., 704) in relation to features (e.g., 705, 706) visible from a field of view (e.g., 701, 703) significantly narrower than $\pi$ radians can have a commensurately large depth uncertainty which increases approximately quadratically with distance [FIG. 7, 704]. The inventors have recognized and appreciated that by enabling calibration of a camera array, multiple cameras may be configured to yield feature matching in a combined field of view (e.g., 711 and 713) approaching or exceeding $\pi$ radians, thereby reducing the depth uncertainty of the camera positions to scale linearly when features (e.g., 717, 718) are visible at wider angles [FIG. 7, 714] (e.g., from fields of view 710, 712). The inventors have recognized and appreciated that given a calibrated array of cameras, various methods may be applied to improve the accuracy of location estimates of the entire array. These methods include, but are not limited to, the use of estimations of feature relative locations using multiple viewpoints (as described in U.S. application Ser. No. 16/267,175).

The inventors have recognized and appreciated that because this approach to multiple camera calibration does not require that a single calibration object be visible to all cameras simultaneously it may be used to calibrate cameras in a monitored environment. In some embodiments, an installation of cameras in one or more rooms can be calibrated by moving a calibration object through the environment such that the recorded images form a connected graph. In some embodiments, the environment itself may be known sufficiently to be used as a calibration object. Alternatively, in the case where a moveable multi-camera rig is being calibrated, the rig can simply be rotated to bring a calibration into view of all cameras, such that the graph of simultaneous views is connected.

The inventors have recognized and appreciated that, in some cases, there may be an optimal relative orientation of the cameras in the array. This alignment may be achieved by distorting the images from each camera to effect a rotation of each camera about its focal point. This image transformation is combined with the image transformations defined by the estimated intrinsics and distortion. For example, in some embodiments, a pair of cameras (e.g., 1001, 1011) may be used to provide a stereoscopic video stream and will be expected to have coaxial horizontal directions (e.g., along axis 1000) and parallel "up" (e.g., 1003, 1013) and "forward" (e.g., 1002, 1012) directions with respect to their views [see FIG. 10]. In the case where a spherical effective imaging surface is chosen, the analogous choice of coordinates has lines of constant longitude defined by the intersection of planes though baseline axis with the spherical imaging surfaces, and lines of constant latitude by constant angles at the focal points from the baseline axis. The physical singularities of this coordinate system occur where rays from one camera would intersect the lens of the other camera, so there is no loss of stereoscopic features.

Figure 10:
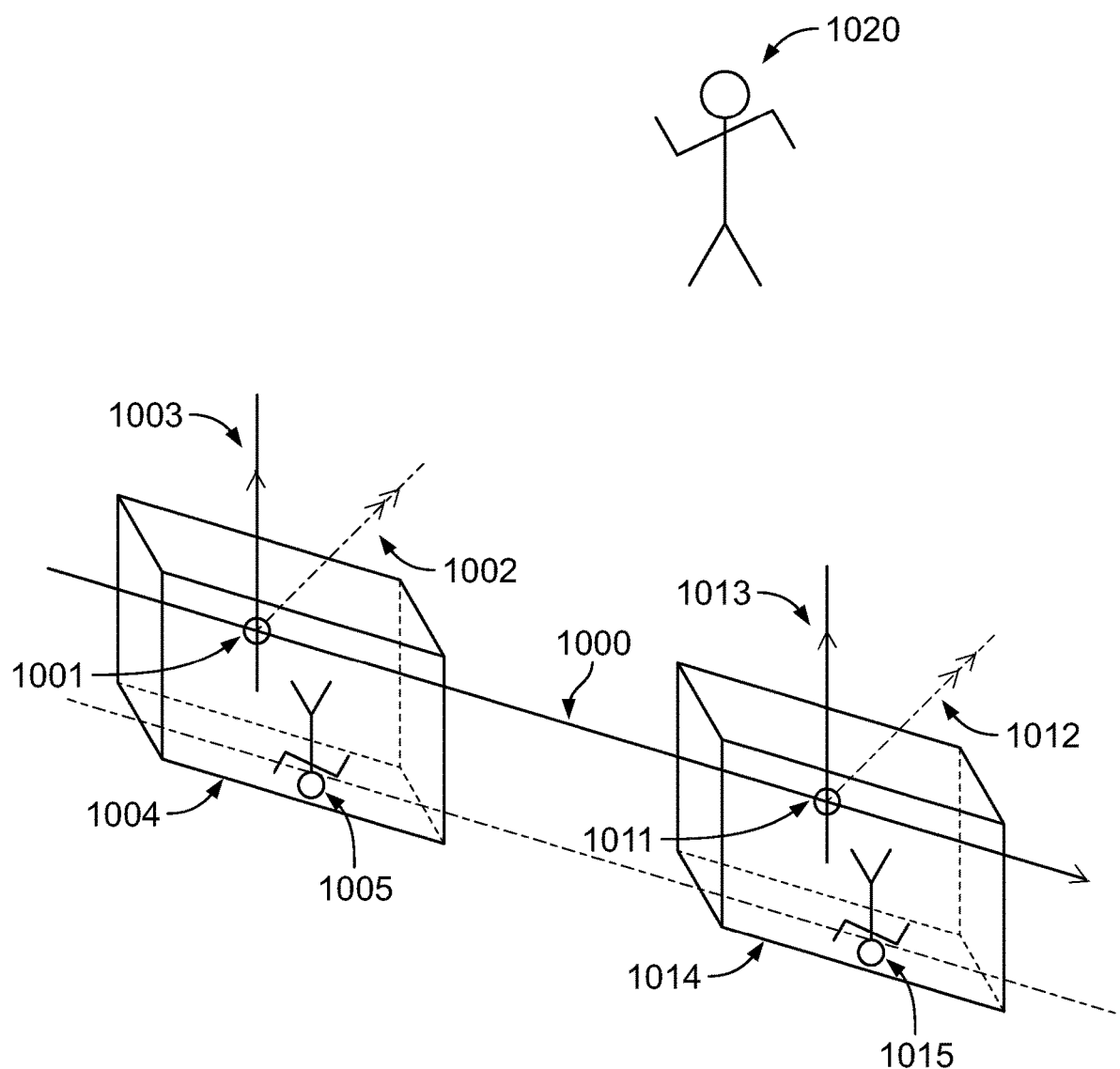
FIG. 10 is an exemplary diagram showing ideal relative locations for a pair of pinhole cameras recording stereoscopic images.

The inventors have recognized and appreciated that, in some embodiments, in which planar effective imaging surfaces are chosen for a pair of stereoscopic cameras (which have identical orientations, but distinct positions) (e.g., 1004, 1014), a calibration that yields planar image surfaces with collinear rows [see FIGS. 10, 1005 & 1015] simplifies the association of point-like features in images, since the projection of a feature points yields points on the same horizontal line, and so corresponding features are near to the same horizontal line with respect to their uncertainties.

The inventors have recognized and appreciated that in some embodiments in which a pair of cameras is used for stereoscopic imaging, a calibration and coordinates may be defined in which corresponding points in simultaneously recorded images have equal angles about the baseline axis of the cameras. The inventors have recognized and appreciated that disparities in these angles may be used to identify a system that is no longer well calibrated. The inventors have additionally recognized and appreciated that by fitting a parameterization of the measured disparities with respect to image coordinates, an adjustment of the calibration parameters can be derived which may return the system to a correct alignment. These adjustments include rotations of the cameras about their parallel (when calibrated) view axes, and rotations of the cameras about their common (when calibrated) horizontal axis.

The inventors have recognized and appreciated that in the case where rendered images are composited with the camera images the rendering process may be more efficient when the corresponding virtual cameras do not have an epipolar or convergence disparity.

An embodiment of a method for calibrating an array of cameras is illustrated in FIG. 3.

Shutter Roll Calibration

In some embodiments, the image sensor of a camera may have shutter roll. In this case, exposure is started on pixels with some relative latency according to the position of the pixel on the imaging surface. Image sensors without shutter roll are generally described as having a "global shutter". In one common design, each row of pixels has a uniform start time, but the start times of rows are delayed according to their height in the image. In general, the shutter roll may be described by a covector $S_{a|I}$ in the distorted image space, yielding a relative latency for a given distance between pixels.

If an image of an object moving relative to the camera is recorded, shutter roll yields a "rolled" image of that object. In the case that the camera is rotated with a constant angular velocity $A^{[2]:a}$ about its focal point, the distorted image produced by a shutter roll $S_a$ can be computed by sampling an undistorted image by lifting each pixel in the distorted image to a ray from the focal point, applying the rotation according to the pixel latency $\lambda$, and reprojecting to an interpolated sample of the undistorted image.

Shutter roll causes a moving camera to record a rolled image. The inventors have recognized and appreciated that, if the shutter roll is known, the distortion due to rotation can be removed by inverting the roll transform to sample undistorted pixels from the distorted image. The function $S_a(P^a - z^a)$ describes the linear latency function on the image at a pixel coordinate $P^a$, and let $P(\lambda)^a$ denote the path of a shutter roll lookup as a function of latency $\lambda$. For each pixel, the unroll lookup is found by solving:

$$\lambda = S_a(p(-\lambda)^a - z^a)$$

The pixel coordinate $p(-\lambda)^a$ specifies the sampling in the rolled image since these coordinates are mapped to the pixel $p(0)^a$ by the shutter roll distortion. This equation may be solved for each pixel using any suitable method. In some embodiments, the derivative with respect to $\lambda$ may be computed, so that the equation can be numerically solved using iterated linear extrapolation.

In embodiments in which there is lens distortion, the image roll latency is defined with respect to the physical imaging surface, so the linear equation for the roll pertains to the distorted image, whereas the roll and lookup pertain to the undistorted image. The inventors have recognized and appreciated that lens distortion will modify the equation to be solved by applying an undistorting transformation before the ray rotation and a distorting transformation after. This modified equation can be solved using any suitable method. In some embodiments, the same method may be applied, in this case including the effect of the distortion on the linear extrapolation.

In the case of a known calibration object, the effect of a shutter roll may be described by considering both the calibration object and the image sensor in space-time coordinates. The focal point becomes a focal line, and the shutter roll defines rays that emanate from the integration event of a pixel and intersect the focal line. The inventors have recognized and appreciated that given a collection of rays that also intersect features on a calibration object, the relative motion of the camera and calibration object can be fit using a motion model. (Considering the relatively short duration of image capture, constant velocity is a viable model in some embodiments.) The inventors have further recognized and appreciated that a given succession of images and a model of object motion the shutter roll may be estimated.

The inventors have recognized and appreciated that unrolling is sufficiently efficient that it can be applied to entire images as a parallelized computation without introducing significant delay in the image display. Consequently, rolling shutter cameras, which are typically less expensive than commensurate global shutter cameras, may be used to stream images from a rotating camera without introducing motion dependent object distortion. The inventors have recognized and appreciated that the model of constant angular velocity can be generated if higher order approximations of the motion during image capture are available.

In general, a camera's motion will include changes in both linear and angular velocity. The inventors have recognized and appreciated that in the case that a depth estimate is available image pixels (e.g. from a sensor, by reconstruction, or by an assumed constant value) distortions due to changes in position may also be removed by an analogous roll path solve, which in this case includes a modification of the lookup as the ray depth is changed.

Relative Motion Estimation from Tracker Measurements

Figure 4:
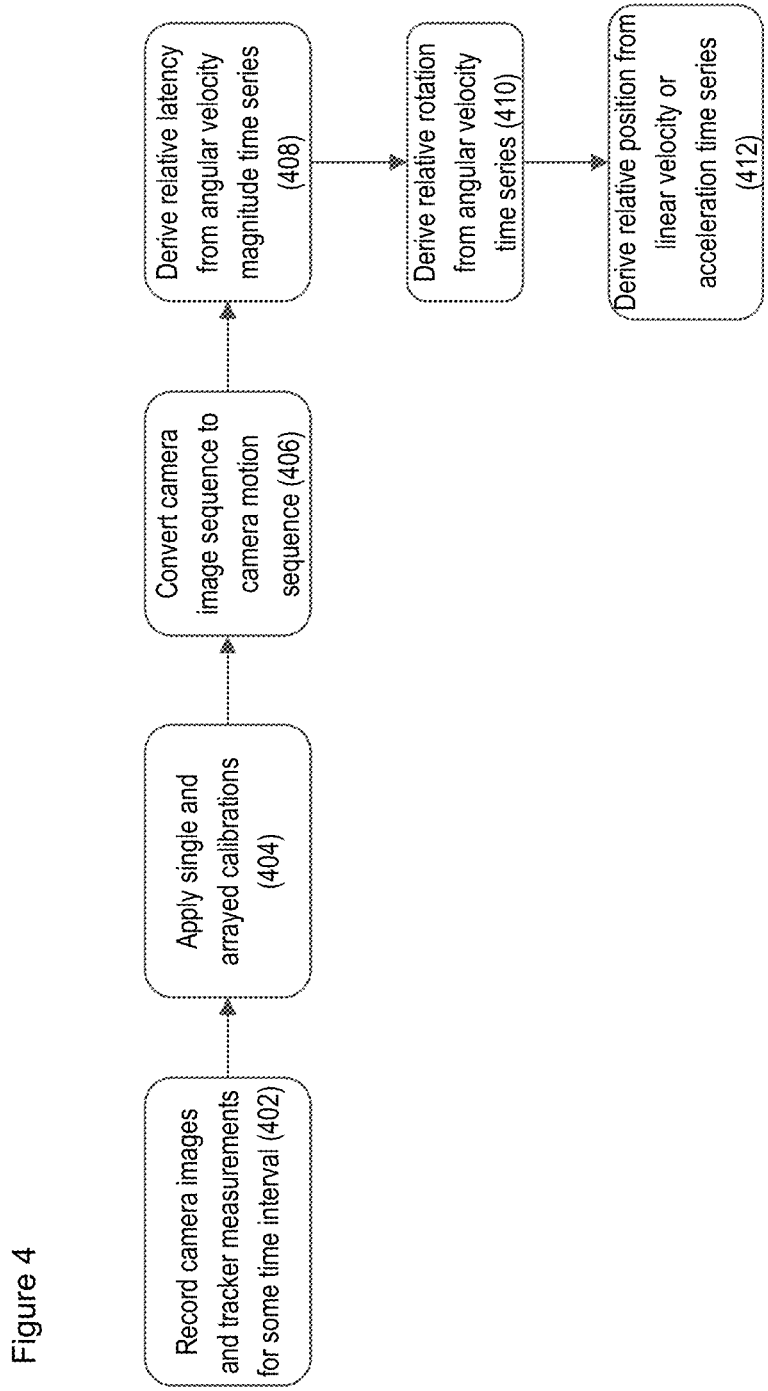
FIG. 4 is a flow chart illustrating the steps of a method of calibrating the relative latency, rotation and position of two devices that yield measurements of motion, according to some embodiments.

In some embodiments one or more cameras may be mounted on an object whose position and orientation are measured by a "tracker" with some frequency (e.g., over a time interval) (see step 402 of FIG. 4). The "tracker location" refers to a point rigidly attached to the cameras, as opposed to the location of any external systems used to enable the tracker. In one embodiment, the cameras may be mounted on a stereoscopic display whose tracked position is used to determine a rendered viewpoint. In another embodiment, the tracked position may be relied on for analysis of the images collected from the cameras. In these cases there may be an invariant location of the cameras relative to the tracker, which will be referred to as the "mounting".

Since determination of the mounting requires a comparison of estimated locations at various times, a known latency of the camera relative to the tracker is useful. This consideration pertains to, but is not limited to, a situation in which the camera and tracker are communicating with a computer and reference that computer's unified clock. The "latency" in this context is the mean difference in recording time between the most recent tracker data and most recent camera data available to a computer at any given time. As such, a positive latency indicates that the tracker measurements are on average more recent. It is expected that the latency is an invariant property of the system.

In step 404, the system may be configured to apply the single or arrayed calibrations described herein. The inventors have recognized and appreciated that this calibration may be performed by relying on the determination of the position and orientation of the cameras by observing a stationary calibration object. (Unlike the preceding stages of the calibration, here it may be critical that the calibration object is stationary while the tracked object and mounted cameras are moved.) Without loss of generality, suppose that a tracking system provides a data sequence where each entry contains a time, a position and an orientation with respect to tracker coordinates. Likewise, the determination of the extrinsic Euclidean Transformation of one or more cameras (described above of single and arrayed cameras) relative to the stationary calibration object yields a data sequence where each entry contains a time, a position and an orientation with respect to camera coordinates [FIG. 4, 406].

The inventors have recognized and appreciated that measurements of motion from separate devices may not be synchronized. This obstacle can be overcome by constructing interpolating functions thereby enabling comparisons between any respective times. The tracker and camera positions and rotations may be interpolated using any suitable method, preferably one that is coordinate independent and that yields a continuous function of time with a continuous first derivative. Possible approaches to interpolation include but are not limited to, acceleration minimizing splines with knot force determined by measurement uncertainties, or cubic splines with respect to positions and general linear transformations parameterized by time and projected to rotations.

The first stage of the motion calibration is a determination of the latency [FIG. 4, 408], which in this context is the time interval from when measurements are received from the tracker to when measurements of the same motion are received from the cameras. Because the relative positions and rotations of the tracker and camera coordinates are unknown, only the magnitude of angular velocity (and its derivatives) will be equal at corresponding times. The inventors have recognized and appreciated that the latency can be estimated from a comparison of the tracker and camera angular velocity magnitudes as a function of time. The inventors have recognized and appreciated that uncertainties in measurements may be propagated to an estimated uncertainty of the relative latency.

A comparison of measurements of the magnitudes of angular velocities may require an interpolation of one or both sequences. Interpolation may be accomplished using splines, a smoothing filter with some model of motion, a locally fitted basis of functions, or any other suitable method. The estimation of latency may be performed using any suitable method, including but not limited to, identification of the minimum of the windowed mean squared difference of interpolated measurements with respect to latency. In some cases, the uncertainty associated with tracker or camera measurements may vary, in which case the accuracy of the comparison may be improved by considering a squared distance relative to the uncertainty, either with respect to the measured values, the filtered interpolation, or a fitted basis. Using the interpolation, the evaluation of the minimum may be refined at a finer scale than the measurement interval. Given an estimate of the latency, all measurement times will be simply denoted by the tracking time t.

Given an estimate of the latency, the orientations as functions of time may be compared [FIG. 4, 410]. Measurements of the tracker orientation and the camera orientation may be described with respect to different stationary bases. Let the tracker basis be denoted by $\zeta$ and the camera basis by $\xi$. The descriptions of the tracker angular velocity $TAV(t)^{[2]:\alpha|\zeta}$ and the camera angular velocity $CAV(t)^{[2]:\alpha|\xi}$ are related only by an invariant mounting rotation $MR_{\beta|\zeta}{}^{\alpha|\xi}$ in the order 2 antisymmetric tensor representation [2]. (In 3 dimensions the components of [2] are represented as axes of rotation.)

$$CAV(t)^{[2]:\alpha|\xi} = MR_{[2]:\beta|\zeta}{}^{[2]:\alpha|\xi} TAV(t)^{[2]:\beta|\zeta}$$

Violations of this equality at corresponding times contribute an associated error to an objective function according to the uncertainties of the angular velocity measurements from the camera and tracker. With respect to this objective function an optimization restricted to [2] representations of rotations may be performed using any suitable methods. The inventors have recognized and appreciated that by constructing and optimizing this objective function the relative rotation $MR_b{}^a$ of camera and tracking coordinates may be estimated. The inventors have recognized and appreciated that uncertainties in measurements of the angular velocities, and an estimated uncertainty of the latency may be propagated to yield an estimated uncertainty of the relative rotation.

Given a change of basis $MR_b{}^a$, the invariant mounting position $MP^a$ of the camera relative to the tracker may be estimated from their relationship to the tracker linear velocity $TLV(t)^a$ and the camera linear velocity $CLV(t)^a$ [FIG. 4, 412]. Let the spanning basis of the Lie algebra of rotation generators be denoted by $g_{[2]:a,b}{}^c$, then the relationship between the tracker angular velocity and the difference between camera and "tracker" linear velocities can be expressed as follows:

$$TAV(t)^{[2]:c} g_{[2]:c,b}{}^a MP^b = MR_b{}^a CLV(t)^b - TLV(t)^a$$

Violations of this equality at corresponding times contribute an associated error to an objective function according to the uncertainties of the linear velocity measurements from the camera and tracker. The tracker angular velocity in this equation may be assumed to have a reduced uncertainty due to the aggregation of corresponding camera angular velocity measurements. With respect to this objective function, an optimization of $MP^{\beta|\zeta}$ may be performed using any suitable methods. The inventors have recognized and appreciated that uncertainties in the measurements of linear velocity, and estimated uncertainties of the latency and rotation may be propagated to yield an estimated uncertainty of the relative position.

In some cases the tracker may provide measurements of position and rotation, rather than linear and angular velocity. In these cases, differentiation of the measurements summation of the corresponding uncertainties yields the measurements required to estimate the relative locations of the tracker and camera.

The inventors have recognized and appreciated that in some embodiments relative latency, position or rotation may be derived in whole or in part using alternative methods. In some embodiments that camera and tracker may share a common clock. In some embodiments the rotation may be partially constrained by a known "down" direction, indicated visually and by gravitational acceleration. In some embodiments the rotation may be partially constrained by a known "north" direction indicated visually and by magnetic measurements.

The inventors have recognized and appreciated that these methods may be applied to systems of multiple rigidly connected trackers, regardless of their embodiments. In particular, the inventors have recognized and appreciated that cameras are only one possible embodiment of a system providing estimates of linear and angular velocity or acceleration, and that relative motion calibration may also be required in systems without cameras.

An embodiment of a method for calibrating the relative latency, rotation and position of two devices that yield measurements of motion is illustrated in FIG. 4.

Relative Motion Estimation from Inertial Measurements

In some embodiments cameras may be combined with an Inertial Measurement Units (IMU). The data from an IMU consists of measurements of linear acceleration and angular velocity. In this case drift due to the integration of noisy measurements means that an absolute basis and coordinate system cannot be established for the IMU. Nevertheless, knowledge of the relative position and orientation of the cameras to the IMU may assist in various applications, including but not limited to, rendering for Augmented Reality (AR), and Simultaneous Localization And Mapping (SLaM) using camera data.

In some embodiments an invariant background acceleration or angular velocity may be present. For example, an IMU that is stationary relative to the surface of the earth will register a constant acceleration (locally downward), and may also measure the constant angular velocity (locally true north) of the earth. Likewise, on a rapidly rotating satellite the IMU will register a constant angular velocity and a position-dependent acceleration with respect to the body of the satellite. These backgrounds may be determined when the system to be calibrated is deemed to be stationary relative to its environment. It is recognized that these measurements may be used to assist in the determination of origin or position. However, for the sake of generality they will be assumed to have been subtracted from the "inertial" measurements considered below.

Because an inertial measurement unit provides measurements of angular velocity, the estimations of relative latency and rotation are those disclosed above. However, measurements of velocity must be derived by integrating measurements of linear and angular velocity. Consequently, the uncertainty of velocity measurements would grow with time. Instead, an analogous equality can be described between linear accelerations.

$$IAV(t)^{[2]\cdot c}g_{[2]:c,b}{}^{a}IAV(t)^{[2]\cdot e}g_{[2]:e,d}{}^{b}MP^{d}=MR_{b}{}^{a}CLA(t)\\ {}^{b}-ILA(t)^{a}$$

As before, knowledge of the uncertainties converts this equality into an error that is aggregated in an objective function, which may be optimized with respect to $MP^d$ using any suitable technique.

The inventors have recognized and appreciated that this generalization enables motion calibration for a system that includes rigidly connected IMUs, as well other tracking elements, including but not limited to cameras.

The inventors have recognized and appreciated that in a system comprised of cameras and IMUs the frequency of measurements of angular velocity and linear acceleration will typically be much greater than the frequency with which camera images are recorded. Furthermore, an estimation of location from camera images may require more time than an integration of velocity and acceleration from an IMU. Consequently, IMUs may be used to provide low latency high frequency estimates of location, while the cameras are used to reduce the uncertainty, which grows while only IMU measurements are integrated. The inventors have recognized and appreciated that relative motion calibration is a critical step in the creation of a usable system of this type.

Reconciling Multiple Systems

In some embodiments multiple independent systems may need to interact. In some embodiments this interaction may be between two or more users of AR systems in a shared physical space. In some embodiments this interaction may be between two or more autonomously navigating systems, such as drones, each with an independent tracking system. Necessarily each system has an independent coordinate system with respect to which locations of cameras and trackers are described. An interaction necessarily relies on the communication of the relevant locations of each system's constituent trackers and cameras. The inventors have recognized and appreciated that this communication is predicated on establishing a reconciliation of the systems independent coordinate systems.

In general reconciliation is accomplished in two steps. First, features common to multiple systems are identified. Second, a transformation is found that optimally aligns the features (refer to U.S. application Ser. No. 16/267,175). In the ideal case this aligning transformation is Euclidean. The inventors have recognized and appreciated that errors in calibrations may necessitate non-Euclidean and even non-linear alignments. In some embodiments relative scale may be included in the alignment, which may be required to compensate for calibration errors in the distances between cameras in an array. In some embodiments alignment may be restricted to a region in order to avoid bias from accumulated errors in more distant points.

In embodiments enabling AR applications users may be able to see each other's tracked constituent elements. The inventors have recognized and appreciated that in this case users may assist reconciliation by aligning virtual representations of the other system's tracked constituents with their observed real locations. The inventors have recognized and appreciated that alignment using a Euclidean transformation requires a single oriented object such as a HMD, or 3 non-collinear points such as positions on a HMD and left and right hand controllers.

Latency Compensation

In the case that the images from the camera will be used by a human or other system to perceive and navigate in an environment, it can be beneficial that the delay from camera and tracker to utilization (e.g. display) is known. The inventors have recognized and appreciated that, in the case of a camera system, this delay may be simply measured by configuring the display to show an image that is recognizable by the camera. (For example, a display could remain black except for an interval of one or more white frames that could be displayed.) Given knowledge of the camera delay, and knowledge of the latency, the delay can be determined to an accuracy of one frame interval or less, depending on the phases sampled between the camera frame rate and the screen frame rate. The inventors have recognized and appreciated that the estimated delay may be further refined using an exposure model for the camera and luminance model for the display, and by adjusting the phase of one of the systems.

In some embodiments the camera array will be used to create a Head Mounted Display (HMD) for an Augmented Reality (AR) application using image composition. In this embodiment the user's visual information comes from the combination of the camera array and rendered images. Necessarily there will be some delay from the time when the images are recorded by the cameras to the time when they are displayed to the user. The inventors have recognized and appreciated that user comfort requires that the visual, vestibular and proprioceptive systems remain in agreement.

In some embodiments the phases of the rendering, position and orientation measurements, and images may all be adjusted. The inventors have recognized and appreciated that the ideal phase relationship has the images recorded with as small a delay as possible relative to composition with the renderings, while the tracked update should be timed to occur before the composition, with only enough time to effect the perspective adjustment. The inventors have recognized and appreciated that the calibration of latency described above may be used to guide the phase adjustment of an Augmented Reality system to accommodate an initially unknown rendering frequency and phase, thereby ensuring that the camera and tracking behavior is optimized to the specific application.

In step 502, the system may be configured to predict a camera location. In step 504, the latency of the composition images of the camera can be determined (e.g., estimated). The inventors have recognized and appreciated that, given an estimate of the location of the camera images, the rendering may be "rewound" so that the location of the rendered virtual cameras coincides recording real cameras [FIG. 5, 506]. In this case, a virtual object will appear to be stationary with respect to the real world, but the user's visual information will show motion that is delayed relative to the vestibular and proprioceptive expectations. The inventors have recognized and appreciated that, for some users, this delay may induce nausea or other discomfort and should therefore be minimized.

In step 510, the system may be configured to determine (e.g., estimate, measure, calculate, etc.) velocity at the rewind location. In step 512, the system may be configured to determine "unrolling of the rolling shutter, as discussed herein. In step 530, the system may access a lens undistort lookup table.

Figure 5:
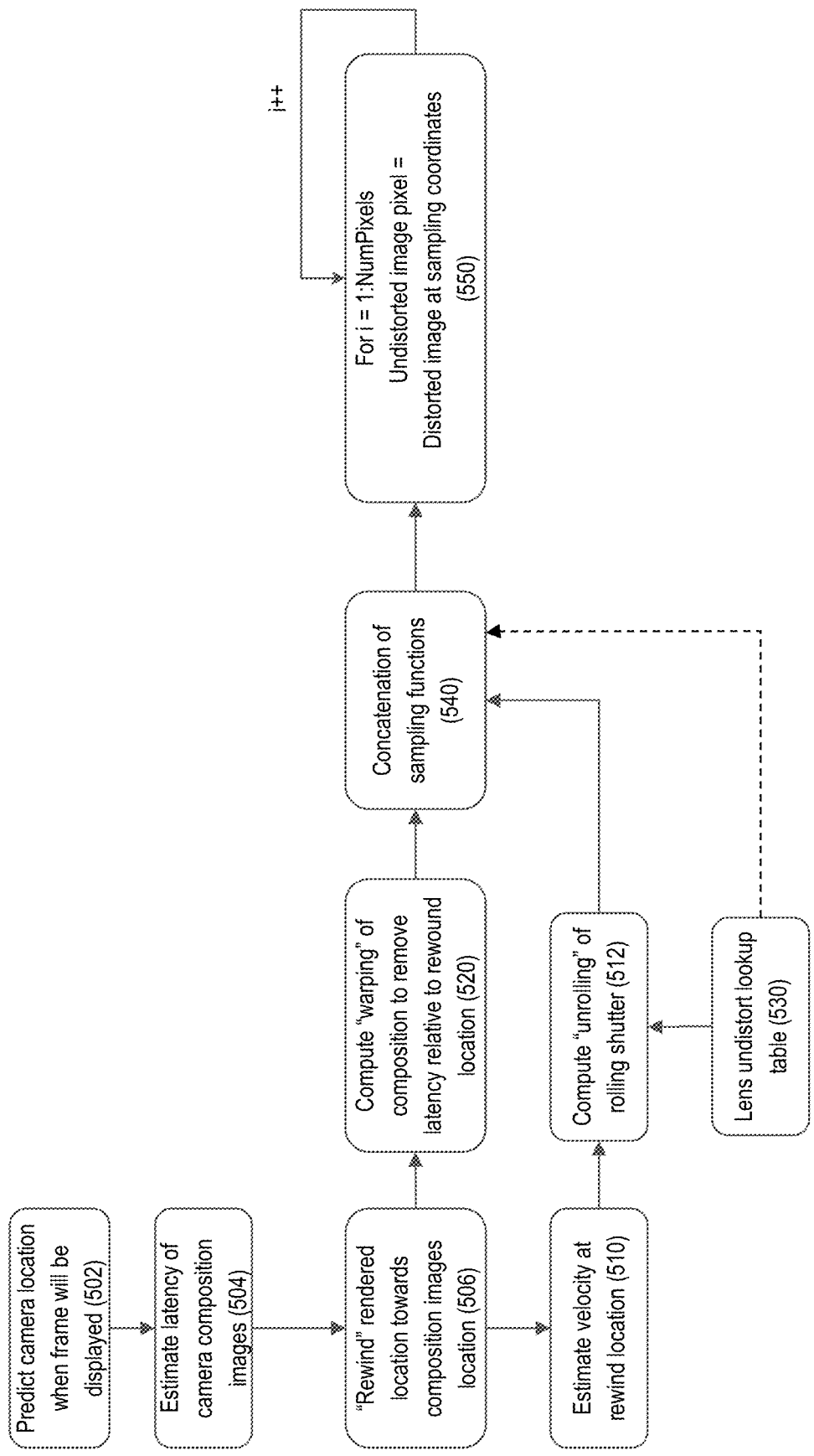
FIG. 5 is a flow chart illustrating the steps of a method of unified image rectification, according to some embodiments.

The inventors have recognized and appreciated that, given a prediction (e.g. from a Kalman filter) of the location of the cameras corresponding to when the images will be displayed, the camera images may be "warped" so that the images approximate the camera's perspective at the displayed time [FIG. 5, 520]. In step 520, the system may be configured to determine the "warping" of the composition to remove latency relative to the rewound location. While this will not remove the visual latency of moving objects, it may remove the visual latency of a moving camera in static environment. In the case that the camera rotates about its focal point during the time from recording to displaying the image, the latency can be removed by computing a lookup in which each pixel is lifted to a ray and the rotation is applied as a homography.

In general, a camera's motion can include changes in both linear and angular velocity. The inventors have recognized and appreciated that in the case that a depth estimate is available image pixels (e.g. from a sensor, by reconstruction, or by an assumed constant value) a change in position can be implemented by raycast sampling of the depth endowed image.

The inventors have recognized and appreciated that the "rewinding" and "warping" methods of rectifying visual motion may be combined. In the absence of accurate depth estimates for image pixels, warping will introduce perceived motion of stationary virtual objects. However, rewinding yields perceived visual motion latency. By addressing a part of the latency rewinding and part of the latency by warping a compromise can be achieved in which both the visual motion latency and the virtual abjection stability are acceptable to users.

In some embodiments, the user may be associated with multiple objects whose location is known. In some embodiments, in addition to a HIVID the user may have one or more controllers. As discussed, the latency of moving objects cannot be removed. The inventors have recognized and appreciated that any virtual objects that are stationary relative to moving tracked objects must be rewound with respect to the latency of the images relative to their respective trackers. In some embodiments users that are visible but connected to other computers may also be included in a shared experience. The inventors have recognized and appreciated that in this configuration the latencies of the images relative to the trackers of other users will include any network latency, which may be measured by any suitable technique.

Unified Image Rectification

The inventors have recognized and appreciated that lens distortion, shutter roll, and/or image latency may be rectified by applying transformations to camera images [FIG. 5, 540]. It is known that an image transformation may be implemented using a sampling method in which non-integer coordinates are interpreted as an interpolation between adjacent pixels. Any suitable interpolation may be used, including but not limited to, quadrilateral region averaging over a constant interpolation, or point sampling from a bi-cubic interpolation. In some embodiments some choices of interpolation may be more efficient due to the presence of dedicated hardware.

By definition, the lens distortion is invariant, and so could be rectified for each image immediately. In some embodiments, since the display resolution is known, the lens distortion rectifying sample coordinates (and derivatives or inversions therefore) may be computed in advance for each pixel (e.g., step 550). Additionally, the shutter roll is independent of the rendered motion, and so could be rectified as soon as an estimate of motion is available. Finally, the warping is known only when the camera rendering location has been defined, and therefore requires a different rectification for each rendered frame. The inventors have recognized and appreciated that in some embodiments the physical camera recording, angular velocity measurement, and virtual camera rendering occur at all different frequencies, so keeping the sampling stages distinct may yield a more computationally efficient embodiment.

Note that warping correction, unrolling, and undistorting are not all required for image rectification. However, it can be beneficial to apply each before step 550 to avoid multiply sampling the image. The inventors have recognized and appreciated that because each sampling involves an interpolation it has the effect, in the worst case, of convolving the image with a 2 pixel wide averaging kernel. Consequently, each sampling stage will reduce the effective resolution of the image by a factor of 2. The inventors have recognized and appreciated that each sampling stage represents a continuous map, and so may be unified as a single map and sampling stage, thereby minimizing the loss of resolution. This increased effective resolution comes at the cost of repeating computation for every rendered image when it could be performed only for each recorded image.

An embodiment of a method of unified image rectification is illustrated in FIG. 5.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 11:
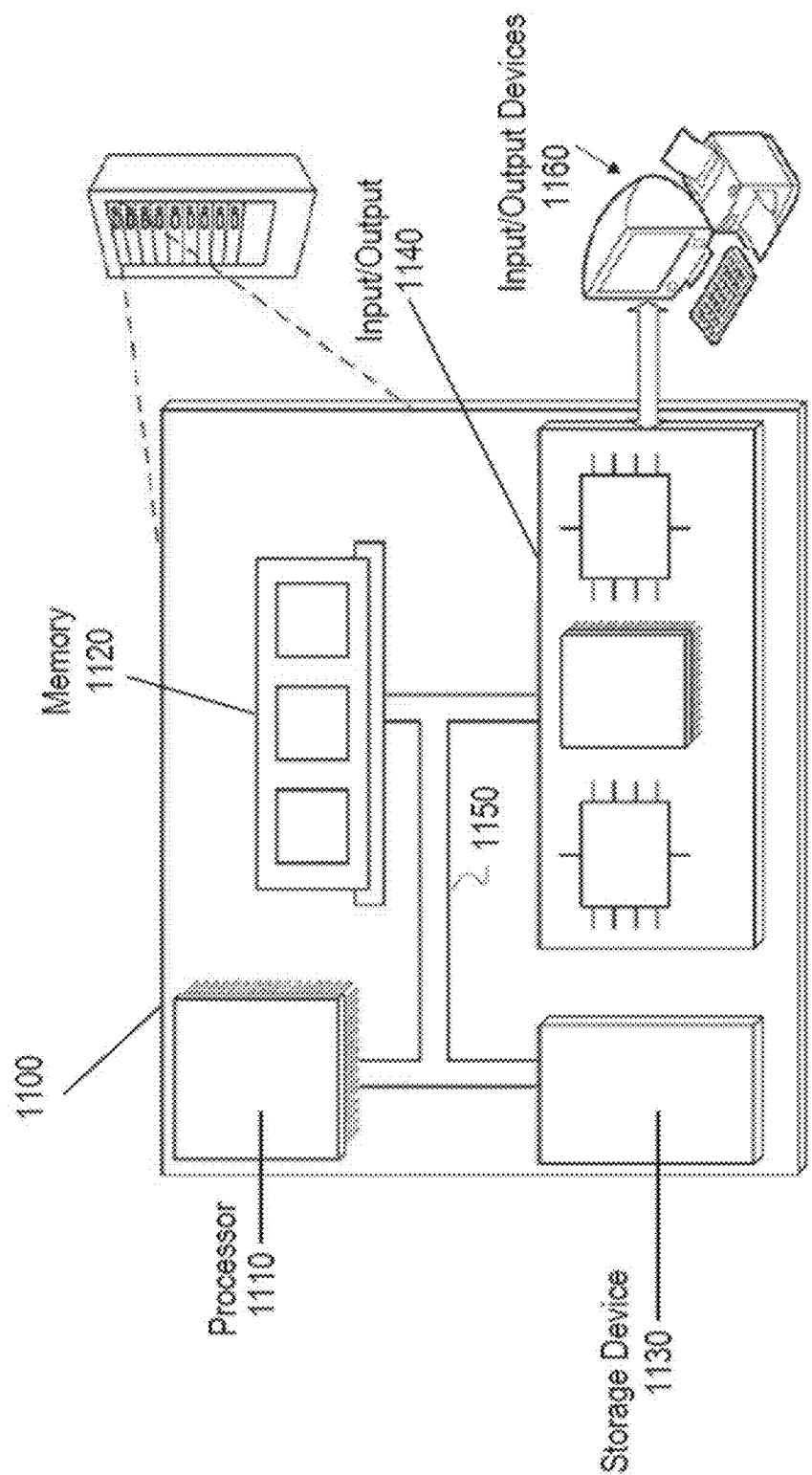
FIG. 11 is a diagram of an example of a computer system.

FIG. 11 is a block diagram of an example computer system 1100 that may be used in implementing the technology described in this document. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a non-volatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-date drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, such as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated. The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for correcting distortion of a camera lens, the method comprising:
    receiving at least one image of a calibration object, wherein the image is captured via the camera lens and the lens has lens distortion, and wherein the calibration object has a plurality of straight lines;
    fitting a plurality of geodesics in the image, the plurality of geodesics in the image corresponding to the respective plurality of straight lines of the calibration object;
    determining at least one Christoffel connection equation for the plurality of geodesics;
    determining a metric based on the Christoffel connection equation, the metric comprising a first distorted radial coordinate;
    determining an undistorted radial coordinate based on the first distorted radial coordinate;
    inverting the undistorted radial coordinate; and
    generating an undistorted image based on the inverted undistorted radial coordinate.

2. The method of claim 1, further comprising:
    storing the undistorted radial coordinate based on the first distorted radial coordinate in a lookup table.

3. The method of claim 1, further comprising determining a second distorted radial coordinate as a function of the undistorted radial coordinate, wherein determining the second distorted radial coordinate as a function of the undistorted radial coordinate comprises:
    integrating the second distorted radial coordinate.

4. The method of claim 1, further comprising:
    based on the undistorted image, determining a plurality of constants of integration of the lens distortion, and wherein generating the undistorted image is based on the plurality of constants of integration.

5. The method of claim 1, further comprising:
    identifying a plurality of image points in the image corresponding to a respective plurality of feature points of the calibration object, wherein the plurality of geodesics are fit based on the plurality of feature points and the plurality of straight lines.

6. The method of claim 5, further comprising:
    determining a significance of at least a subset of the feature points to determine whether any feature points are outliers.

7. The method of claim 1, wherein the lens has a field of view greater than 180 degrees.

8. The method of claim 1, wherein fitting the plurality of geodesics comprises applying a linear regression, applying outlier suppression, and/or applying quality of fit analysis.

9. The method of claim 1, wherein the at least one image results from a projection on an imaging surface, wherein the imaging surface is a planar surface or a spherical surface.

10. The method of claim 1, wherein corrected lens distortion is independent from camera intrinsic parameters and image extrinsic parameters.

11. The method of claim 1, further comprising:
    determining roll transform in the image; and
    inverting the roll transform in the image to generate an undistorted image.

12. The method of claim 11, wherein determining the roll transform in the image comprises:
    for each pixel in the image, solving a latency function to determine the roll transform for the pixel.

13. The method of claim 12, wherein the latency function is solved for a plurality of pixels in parallel.

14. A system for correcting camera lens distortion, the system comprising:
    at least one memory for storing computer-executable instructions; and
    at least one processor for executing the instructions stored on the memory, wherein execution of the instructions programs causes the at least one processor to perform operations comprising:
        receiving at least one image of a calibration object, wherein the image is captured via the camera lens and the lens has lens distortion, and wherein the calibration object has a plurality of straight lines;

fitting a plurality of geodesics in the image, the plurality of geodesics in the image corresponding to the respective plurality of straight lines of the calibration object;

determining at least one Christoffel connection equation for the plurality of geodesics;

determining a metric based on the Christoffel connection equation, the metric comprising a first distorted radial coordinate;

determining an undistorted radial coordinate based on the first distorted radial coordinate;

inverting the undistorted radial coordinate; and generating an undistorted image based on the inverted undistorted radial coordinate.

15. The system of claim 14, wherein the lens has a field of view greater than 180 degrees.

16. The system of claim 14, wherein fitting the plurality of geodesics comprises applying a linear regression, applying outlier suppression, and/or applying quality of fit analysis.

17. The system of claim 14, wherein the at least one image results from a projection on an imaging surface, wherein the imaging surface is a planar surface or a spherical surface.

18. The system of claim 14, wherein the operations further comprise:

determining roll transform in the image; and inverting the roll transform in the image to generate an undistorted image.

19. The system of claim 18, wherein determining the roll transform in the image comprises:

for each pixel in the image, solving a latency function to determine the roll transform for the pixel.

20. The system of claim 19, wherein the linear latency function is solved for a plurality of pixels in parallel.

* * * * *